United States Patent
Ishizuka et al.

(10) Patent No.: US 10,773,241 B2
(45) Date of Patent: Sep. 15, 2020

(54) SEPARATING MEDIUM AND COLUMN FOR LIQUID CHROMATOGRAPHY

(71) Applicants: Mitsubishi Chemical Corporation, Chiyoda-ku (JP); EMAUS KYOTO, INC., Kyoto-shi (JP); KYOTO UNIVERSITY, Kyoto-shi (JP)

(72) Inventors: Norio Ishizuka, Kyoto (JP); Kyoko Konishi, Kyoto (JP); Toshikazu Oda, Kyoto (JP); Yoshinobu Tsujii, Kyoto (JP); Keita Sakakibara, Kyoto (JP); Shoya Yoda, Fukuoka (JP)

(73) Assignees: Mitsubishi Chemical Corporation, Chiyoda-ku (JP); EMAUS KYOTO, INC., Kyoto-shi (JP); KYOTO UNIVERSITY, Kyoto-shi (JP)

(*) Notice: Subject to any disclaimer, the term of this patent is extended or adjusted under 35 U.S.C. 154(b) by 166 days.

(21) Appl. No.: 15/890,959

(22) Filed: Feb. 7, 2018

(65) Prior Publication Data
US 2018/0161758 A1 Jun. 14, 2018

Related U.S. Application Data

(63) Continuation of application No. PCT/JP2016/073329, filed on Aug. 8, 2016.

(30) Foreign Application Priority Data

Aug. 10, 2015 (JP) .................. 2015-158420

(51) Int. Cl.
| | | |
|---|---|---|
| B01J 20/28 | (2006.01) | |
| B01J 20/285 | (2006.01) | |
| C08J 9/36 | (2006.01) | |
| B01D 15/00 | (2006.01) | |
| G01N 30/88 | (2006.01) | |
| B01D 15/32 | (2006.01) | |
| B01J 20/32 | (2006.01) | |
| B01J 20/26 | (2006.01) | |
| B01J 20/286 | (2006.01) | |
| B01D 15/22 | (2006.01) | |
| B01J 20/30 | (2006.01) | |
| B01J 20/281 | (2006.01) | |
| G01N 30/02 | (2006.01) | |

(52) U.S. Cl.
CPC ............ B01J 20/285 (2013.01); B01D 15/00 (2013.01); B01D 15/22 (2013.01); B01D 15/32 (2013.01); B01J 20/262 (2013.01); B01J 20/267 (2013.01); B01J 20/286 (2013.01); B01J 20/28078 (2013.01); B01J 20/28083 (2013.01); B01J 20/28085 (2013.01); B01J 20/3085 (2013.01); B01J 20/3208 (2013.01); B01J 20/3274 (2013.01); C08J 9/36 (2013.01); G01N 30/482 (2013.01); G01N 30/88 (2013.01); C08J 2363/00 (2013.01); G01N 2030/027 (2013.01)

(58) Field of Classification Search
CPC ........ B01J 20/28; B01J 20/285; B01J 20/262; B01J 20/280083; B01J 20/280085; B01J 20/3085; B01D 5/22; C08J 9/36; G01N 30/482
USPC ......................................... 502/402
See application file for complete search history.

(56) References Cited

U.S. PATENT DOCUMENTS

| | | |
|---|---|---|
| 2008/0210626 A1 | 9/2008 | Tsujioka et al. |
| 2010/0213411 A1 | 8/2010 | Hosoya |
| 2011/0284447 A1 | 11/2011 | Hosoya |

FOREIGN PATENT DOCUMENTS

| | | |
|---|---|---|
| JP | 61-72036 | 4/1986 |
| JP | 1-262468 | 10/1989 |
| JP | 4-317740 | 11/1992 |
| JP | 2009-269948 | 11/2009 |
| JP | 2011-46856 | 3/2011 |
| JP | 2011-252723 | 12/2011 |
| WO | WO 2006/073173 A1 | 7/2006 |
| WO | WO 2011/019033 | 2/2011 |

OTHER PUBLICATIONS

Extended European Search Report dated Jun. 18, 2018 in European Patent Application No. 16835150.0 citing documents AA-AB therein, 7 pages.
International Search Report dated Oct. 11, 2016 in PCT/JP2016/073329, filed on Aug. 8, 2016(with English Translation).
Written Opinion dated Oct. 11, 2016 in PCT/JP2016/073329, filed on Aug. 8, 2016.

*Primary Examiner* — Edward M Johnson
(74) *Attorney, Agent, or Firm* — Oblon, McClelland, Maier & Neustadt, L.L.P.

(57) ABSTRACT

The present invention provides a separating medium including porous resin particles which has a sufficient pore diameter suitable for liquid chromatography applications and which has high strength, is reduced in pressure loss during liquid passing, has the excellent property of separating a desired substance, and has low nonspecific adsorption properties. The separating medium of the invention is a separating medium obtained by treating porous epoxy resin particles and having an average pore diameter of 10 to 2,000 nm, or a separating medium obtained by treating porous epoxy resin particles and having a water content of 50% or higher.

17 Claims, No Drawings

SEPARATING MEDIUM AND COLUMN FOR LIQUID CHROMATOGRAPHY

TECHNICAL FIELD

The present invention relates to separating medium which are useful, for example, as separating medium for vaccine purification and separating medium for protein purification, and to column for liquid chromatography which contains the separating medium.

BACKGROUND ART

In the production and development of biopolymers including proteins, liquid chromatography is frequently used for adsorbing, separating, or purifying the biopolymers. Known carriers for use in separating medium for liquid chromatography include inorganic carriers such as silica gel and hydroxyapatite, natural polymeric carriers such as agarose, dextran, cellulose, and chitosan, and synthetic polymeric carriers such as polystyrene and poly(meth)acrylic esters. These carriers are used as such or used after various functional groups are imparted thereto according to need in order to render the carriers usable in a variety of separation modes.

Recently, many proposals have been made on epoxy-resin-based carriers for use as separating medium for liquid chromatography, from the standpoints of impact resistance, chemical resistance, durability, handleability, production efficiency, etc.

Patent Document 1 proposes a porous cured epoxy resin object usable as the carrier of an affinity gel or as a purifying medium, absorbing/adsorbing medium, packing material for column chromatography, etc. This porous cured epoxy resin object is a porous object which has voids communicating with the three-dimensional network backbone of the cured epoxy resin and in which the three-dimensional network backbone constitutes the porous object, which is of a non-particle-aggregation type configured of columnar three-dimensional branched structures. In this porous object, the proportion of aromatic-ring-derived carbon atoms to all the carbon atoms constituting the cured epoxy resin is 0.10 to 0.65. Furthermore, this porous object has a porosity of 20 to 80% and an average pore diameter of 0.5 to 50 μm. Although Patent Document 1 indicates that the porous cured epoxy resin object can have any shape such as a sheet shape, rod shape, or cylindrical shape, there is no mention of particulate shape therein.

Patent Document 2 proposes a porous object suitable for use as, for example, a separating medium for chromatography, porous object for blood separation, sample concentration medium for environmental analysis, porous object for moisture absorption, porous object for adsorbing low-molecular-weight substances for the purpose of deodorization, etc., porous membrane for use in a membrane emulsification method for producing fine particles with an even diameter, or porous object for use as an enzyme carrier or catalyst carrier. This porous object has a three-dimensional network structure backbone constituted of a cured epoxy resin and has voids, and the backbone has mesopores therein having a pore diameter of 1 nm to 1 μm. Patent Document 2 also indicates that the porous object can be easily made to have any shape such as a sheet shape, rod shape, or cylindrical shape. However, Patent Document 2 includes no mention of particulate shape.

Patent Document 3 proposes a porous cured epoxy resin object which is a cured epoxy resin of a porous structure obtained by heating a liquid mixture including an alicyclic epoxy compound having three or more epoxy groups in the molecule, an alicyclic amine hardener, and a solvent inert to both the alicyclic epoxy compound and the alicyclic amine hardener to obtain a cured object and then removing the solvent from the cured object. Patent Document 3 also indicates that the porous object may have a shape such as a sheet shape, rod shape, or cylindrical shape, but there is no mention of particulate shape therein.

Patent Document 4 proposes a process for producing a porous cured epoxy resin object, wherein a liquid mixture including an epoxy resin (component A), an amine hardener (component B), and a solvent (component C) inert to the components A and B is heated under the temperature conditions of 30-55° C. for 6 hours or longer to obtain a cured object and the component C is then removed from the cured object to obtain the porous cured epoxy resin object. Patent Document 4 also merely indicates that the porous object to be produced can have any shape such as a sheet shape, rod shape, or cylindrical shape, and there is no mention of particulate shape therein.

Patent Document 5 discloses porous spherical epoxy-based particles obtained by adding a water soluble amine based compound to an epoxy compound emulsion containing, dissolved therein, a compound which is compatible with the epoxy compound and is extractable or volatilizable, thereby producing cured spherical epoxy particles, and removing the extractable or volatilizable compound from these particles by extraction or volatilization.

RELATED ART DOCUMENTS

Patent Documents

Patent Document 1: International Publication WO 2006/073173
Patent Document 2: JP-A-2009-269948
Patent Document 3: International Publication WO 2011/019033
Patent Document 4: JP-A-2011-46856
Patent Document 5: JP-A-61-72036

SUMMARY OF THE INVENTION

Problems to be Solved by the Invention

As described above, the conventional porous epoxy resin objects for use as carriers for chromatography are each supplied as a monolithic porous object integrated with a column and having a shape such as a sheet shape, rod shape, or cylindrical shape. However, such monolithic porous objects have drawbacks in that these porous objects are difficult to accommodate a column size change and the replacement cost is high.

In contrast, porous epoxy resin objects of a particulate shape are free from such problems and are capable of easily accommodating a variety of configurations. However, for porous particles, it is difficult to design the porous particles so as to attain satisfactory values of pore diameter, strength, and pressure loss during liquid passing, which are required for use in packing into liquid chromatography columns. In general, porous particles having a large pore diameter tend to have reduced strength and hence show an increased pressure loss. Meanwhile, porous particles reduced in pressure loss by enhancing the strength undesirably have a reduced pore diameter, resulting in a problem in that the porous particles are usable as a separating medium only in limited applications. The known porous particles for use as separating medium for liquid chromatography columns are limited to porous particles that have pores insufficient for the intended use, like, for example, the porous spherical epoxy-based particles disclosed in Patent Document 5, which have an extremely small pore volume of about 20 to 30% by weight in terms of water retention.

An object of the present invention, which has been achieved in view of the state of prior-art techniques described above, is to provide particulate porous resinous separating medium which have a sufficiently large pore diameter suitable for liquid chromatography applications and which have high strength, are reduced in pressure loss during liquid passing, have the excellent property of separating a desired substance, and have low nonspecific adsorption properties. Another object thereof is to provide columns for liquid chromatography which employ the separating medium.

Means for Solving the Problems

The present inventors diligently made investigations in order to overcome the problems and, as a result, have discovered that the problems can be eliminated by giving an appropriate treatment to porous epoxy resin particles. The present invention has been thus completed.

The present invention includes the following as essential features.

[1] A separating medium obtained by treating porous epoxy resin particles, which has an average pore diameter of 10 to 2,000 nm.

[2] A separating medium obtained by treating porous epoxy resin particles, which has a water content of 50% by weight or higher.

[3] The separating medium according to [2], which has an average pore diameter of 10 to 2,000 nm.

[4] The separating medium according to any one of [1] to [3], wherein the porous epoxy resin particles are particles of an epoxy resin corresponding to an addition polymer containing a polyfunctional compound containing an epoxy group and a polyfunctional compound containing an amino group, which has an average particle diameter of 1 to 1,000 µm.

[5] The separating medium according to [4], wherein the polyfunctional compound containing an epoxy group is at least one of N,N,N',N'-tetraglycidyl-m-xylylenediamine and triglycidyl isocyanurate.

[6] The separating medium according to any one of [1] to [5], wherein the treatment is a hydrophilization treatment wherein a compound having at least one of a hydroxyl group and an amino group is added to epoxy groups remaining in the surface of the porous epoxy resin particles, thereby opening the rings of the epoxy groups.

[7] The separating medium according to any one of [1] to [5], wherein the treatment is a grafting treatment in which a water-soluble polymer having an ionic functional group is added to the porous epoxy resin particles through at least one of epoxy groups and amino groups remaining in the surface of the porous epoxy resin particles.

[8] The separating medium according to any one of [1] to [5], wherein the treatment is a coupling treatment in which at least one of a protein and a protein derivative is added to the porous epoxy resin particles through at least one of epoxy groups and amino groups remaining in the surface of the porous epoxy resin particles.

[9] The separating medium according to any one of [1] to [8], which satisfies the following properties (1) and (2).

(1) The separating medium, when dried and examined with a micro-compression tester, has a strength at 10% compressive deformation of 2.0 MPa or higher.

(2) The pressure loss determined through a measurement made by the following pressure loss measuring method is 7.0 MPa or less.

<Pressure Loss Measuring Method>

The separating medium is packed into a column having a capacity of 4 mL (inner diameter, 0.5 mm; layer height, 20 cm), and this column is connected to an HPLC system manufactured by Hitachi, Ltd. (Hitachi LC ELITE LaChrom; column oven L-2350; RI detector L-2490; autosampler L-2200). Pure water is passed through the column at a flow rate of 1.3 mL/min (linear velocity, 400 cm/h). The resultant indicated pressure was taken as the pressure loss.

A separating medium obtained by treating porous resin particles, which satisfies the following properties (1) and (2).

(1) The separating medium, when dried and examined with a micro-compression tester, has a strength at 10% compressive deformation of 2.0 MPa or higher.

(2) The pressure loss determined through a measurement made by the following pressure loss measuring method is 7.0 MPa or less.

<Pressure Loss Measuring Method>

[10] The separating medium is packed into a column having a capacity of 4 mL (inner diameter, 0.5 mm; layer height, 20 cm), and this column is connected to an HPLC system manufactured by Hitachi, Ltd. (Hitachi LC ELITE LaChrom; column oven L-2350; RI detector L-2490; autosampler L-2200). Pure water is passed through the column at a flow rate of 1.3 mL/min (linear velocity, 400 cm/h). The resultant indicated pressure was taken as the pressure loss.

[11] The separating medium according to any one of [1] to [10], which has a nonspecific adsorption property, as determined through the following nonspecific adsorption test, of 5% or less.

<Nonspecific Adsorption Test>

The separating medium dispersed in water is immersed in 2.5 mg/mL aqueous immunoglobulin G (IgG) solution and allowed to adsorb the IgG at 25° C. for 3 hours. The recovery of IgG is evaluated on the basis of the absorbances at 280 nm of the supernatant of before and after the adsorption. Furthermore, the separating medium after the IgG adsorption is taken out by centrifugal separation and rinsed in 0.1N aqueous NaOH solution, and the resultant mixture is filtered. The filtrate is examined by a bicinchoninic acid protein assay (BCA) to determine the recovery of IgG due to the NaOH treatment. The sum of the IgG recovery (%) from the supernatant and the IgG recovery (%) due to the NaOH treatment, both based on the IgG contained in the aqueous IgG solution, is subtracted from 100%, and this value is taken as the value of nonspecific adsorption property (%).

[12] A separating medium for vaccine purification, which includes the separating medium according to any one of [1] to [11].

[13] A separating medium for protein purification, which includes the separating medium according to any one of [1] to [11].

[14] A column for liquid chromatography which includes the separating medium according to any one of [1] to [13] and a vessel in which the separating medium has been packed.

Effects of the Invention

The separating medium of the invention not only can be designed to have pore diameters suitable for liquid chromatography applications but also have high strength, a low pressure loss during liquid passing, the excellent property of separating a desired substance, and low nonspecific adsorption properties. The separating medium of the invention are hence industrially useful as various separating medium including separating medium for vaccine purification and separating medium for protein purification.

MODES FOR CARRYING OUT THE INVENTION

Although the present invention is described below in detail, the invention is not limited to the following embodiments and can be variously modified within the gist of the invention. In this description, the symbol "-" used for expressing a range means that the numerical values or property values that precede and succeed the symbol are included in the range.

In this description, the term "(meth)acrylic" indicates "acrylic" and/or "methacrylic", and the term "(co)polymerization" means "polymerization" and/or "copolymerization". The same applies to "(meth)acrylate". The term "(poly)alkylene . . . " means "alkylene . . . " and/or "polyalkylene . . . ". The same applies to "(poly) ethylene . . . ".

The separating medium according to a first aspect of the present invention is a separating medium obtained by treating porous epoxy resin particles and is characterized by satisfying the following (i) and/or (ii).
(i) To have an average pore diameter of 10 to 2,000 nm.
(ii) To have a water content of 50% by weight or higher.

The separating medium according to a second aspect of the present invention is a separating medium obtained by treating porous resin particles and is characterized by satisfying the following properties (1) and (2).
(1) The separating medium, when dried and examined with a micro-compression tester, has a strength at 10% compressive deformation of 2.0 MPa or hither.
(2) The pressure loss determined through a measurement made by the following pressure loss measuring method is 7.0 MPa or less.
<Pressure Loss Measuring Method>

The separating medium is packed into a column having a capacity of 4 mL (inner diameter, 0.5 mm; layer height, 20 cm), and this column is connected to an HPLC system manufactured by Hitachi, Ltd. (Hitachi LC ELITE LaChrom; column oven L-2350; RI detector L-2490; autosampler L-2200). Pure water is passed through the column at a flow rate of 1.3 mL/min (linear velocity, 400 cm/h). The resultant indicated pressure was taken as the pressure loss.

The porous epoxy resin of the porous epoxy resin particles which constitute the separating medium according to the first aspect and the porous resin of the porous resin particles constituting the separating medium according to the second aspect are each a porous resin having a three-dimensional network backbone structure. It is preferable that the backbone part of this three-dimensional network backbone structure should be not an aggregate of fine resin particles but a columnar continuous phase. A porous resin having such a three-dimensional network backbone structure of the non-particle-aggregation type may be produced in the flowing manner in the case of, for example, porous epoxy resin particles, as will be described later. In producing an addition polymer of a polyfunctional compound containing an epoxy group and a polyfunctional compound containing an amino group, the polyfunctional compound containing an epoxy group and the polyfunctional compound containing an amino group are dissolved in a porogen to prepare an even mixture solution. This solution is added to a surfactant (dispersant), and the resultant mixture is stirred to cause emulsion polymerization. During this step, the individual emulsion particles come to have a co-continuous structure formed therein by the spinodal decomposition of the addition polymer and the porogen. This co-continuous structure constitutes the columnar backbone of the three-dimensional network backbone structure of each porous epoxy resin particle. The porous epoxy resin particles are thus formed. In the case of porous resins other than epoxy resins, a three-dimensional network backbone structure having a columnar backbone is formed on the same principle.

The term "porogen" in this description means an inert solvent or inert-solvent mixture which serves as a pore-forming agent. As described above, pores can be formed by polymerizing starting materials for a porous epoxy resin or porous resin, with a porogen coexistent therewith, and thereafter removing the porogen from the mixture obtained by the polymerization reaction. Thus, a porous resin of a three-dimensional network backbone structure of the non-particle-aggregation type can be produced.

By forming the three-dimensional network backbone structure having a columnar backbone, the particles can be made to retain high strength even when the particles have an increased pore diameter or have through-holes or are in the porous state called perfusion. A decrease in pressure loss can hence be attained. Furthermore, since a low pressure loss can be maintained, it is possible to enhance the separating properties by reducing the particle diameter.

[Separating Medium According to First Aspect]
[Process for Producing Porous Epoxy Resin Particles]

Processes for producing the porous epoxy resin particles (hereinafter sometimes referred to as "porous epoxy resin particles of the invention") for constituting the separating medium of the invention are not particularly limited. For example, the porous epoxy resin particles may be produced in the following manner as will be described in Production Example 1 later. In producing a porous epoxy resin by reacting a polyfunctional compound containing an epoxy group and a polyfunctional compound containing an amino group by addition polymerization in the presence of a porogen serving as a pore-forming agent, a surfactant is used to emulsify the ingredients and the polymerization reaction proceeds in the emulsion with heating and stirring. As a result, a co-continuous structure is formed by the spinodal decomposition of the addition polymer and the porogen. This co-continuous structure constitutes the columnar backbone of the three-dimensional network backbone structure of each porous epoxy resin particle. Thus, the porous epoxy resin particles of the invention can be produced. More specifically, a polyfunctional compound containing an epoxy group, a polyfunctional compound containing an amino group, and a porogen are used to prepare a liquid mixture (hereinafter sometimes referred to as "starting-material mixture"). This starting-material mixture is mixed with a separately prepared surfactant (dispersant) to obtain an emulsion, and polymerization reaction proceeds in this emulsion.

This production process is explained below.
<Polyfunctional Compound Containing an Epoxy Group>

The polyfunctional compound containing an epoxy group as a starting material for the porous epoxy resin particles of the invention is an epoxy compound having two or more epoxy groups in the molecule. It is preferable that the polyfunctional compound containing an epoxy group should have three or more epoxy groups. The polyfunctional compound containing an epoxy group may be either an aromatic epoxy compound or a nonaromatic epoxy compound. The polyfunctional compound containing an epoxy group may be either a high-molecular-weight compound (oligomer or epoxy resin) or a low-molecular-weight compound (monomer).

Examples of the aromatic epoxy compound include: polyphenyl epoxy compounds such as bisphenol A epoxy compounds, brominated bisphenol A epoxy compounds, bisphenol F epoxy compounds, bisphenol AD epoxy compounds, stilbene epoxy compounds, biphenyl epoxy compounds, bisphenol A novolac epoxy compounds, cresol novolac epoxy compounds, diaminodiphenylmethane epoxy compounds, and tetrakis(hydroxyphenyl)ethane-based compounds; and epoxy compounds containing a heteroaromatic ring, such as fluorene-containing epoxy compounds and triazine-ring-containing epoxy compounds.

Preferred are bisphenol A epoxy compounds, brominated bisphenol A epoxy compounds, bisphenol F epoxy compounds, bisphenol AD epoxy compounds, fluorene-containing epoxy compounds, and triglycidyl isocyanurate. Especially preferred are the following epoxy compounds which each have an epoxy equivalent of 500 or less and a melting point of 100° C. or lower: bisphenol A epoxy compounds, brominated bisphenol A epoxy compounds, bisphenol F epoxy compounds, bisphenol AD epoxy compounds, and fluorene-containing epoxy compounds.

N,N,N',N'-tetraglycidyl-m-xylylenediamine, which is represented by the following formula (c), is also preferred as the aromatic epoxy compound.

[Chem. 1]

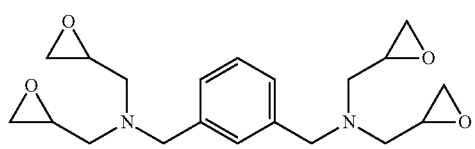

(c)

Examples of the nonaromatic epoxy compound include aliphatic glycidyl ether epoxy compounds, aliphatic glycidyl ester epoxy compounds, alicyclic glycidyl ether epoxy compounds, and alicyclic glycidyl ester epoxy compounds. Preferred are alicyclic glycidyl ether epoxy compounds and alicyclic glycidyl ester epoxy compounds. Especially preferred are alicyclic glycidyl ether and alicyclic glycidyl ester epoxy compounds each having an epoxy equivalent of 500 or less and a melting point of 100° C. or lower.

An alicyclic epoxy compound having three or more, for example, three or four, epoxy groups in the molecule can be advantageously used as the nonaromatic epoxy compound. Using such an alicyclic epoxy compound having three or more epoxy groups in the molecule makes it possible to produce porous epoxy resin particles which combine an appropriate pore diameter and strength.

The alicyclic epoxy compound having three or more epoxy groups in the molecule is not particularly limited, and a compound having an alicyclic hydrocarbon group and three or more epoxy groups can be suitably used. From the standpoint of further enhancing the hydrophilicity, it is preferable that the alicyclic epoxy compound having three or more epoxy groups in the molecule should be an alicyclic epoxy compound containing one or more nitrogen atoms therein. More preferred is a compound represented by the following formula (1). In the case of producing the separating medium through the hydrophilization treatment which will be described later, it is preferred to enhance the hydrophilicity of the porous epoxy resin particles. In the case of introducing, for example, functional groups or biomolecules, it is preferred to enhance the hydrophilicity from the standpoint of increasing the amount of reactive groups capable of introducing such groups or molecules into the surface of the porous epoxy resin particles.

[Chem. 2]

(1)

(In formula (1), X represents an alicyclic hydrocarbon group having 3-8 carbon atoms and bound to the nitrogen atom either directly or through a linear alkylene group having 1-5 carbon atoms; Y represents an epoxy group bound to the nitrogen atom either directly or through a linear alkylene group having 1-5 carbon atoms; m and n are integers selected so that the total number of Y's is 3 or larger; m is any integer of 2 to 4; the multiple n's each independently represent an integer of 1 or 2; the multiple p's each independently represent an integer of 0 or 1; and the sum of p and n is 2.)

X in formula (1) is an alicyclic hydrocarbon group having 3-8 (more preferably 4-7, even more preferably 5 or 6) carbon atoms and bound to the nitrogen atom either directly or through a linear alkylene group having 1-5 (more preferably 1-3, even more preferably one) carbon atoms. The linear alkylene group which can be present between the nitrogen atom and the alicyclic hydrocarbon group is a methylene group, ethylene group, propylene group, or the like. In case where the number of carbon atoms of such linear alkylene group exceeds the upper limit, the porous object tends to have reduced mechanical strength. Examples of X, in the case where m in the formula is 2, include the groups represented by the following formulae (I) to (VI).

[Chem. 3]

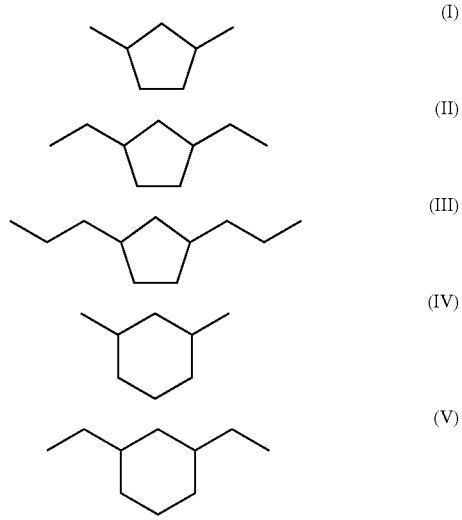

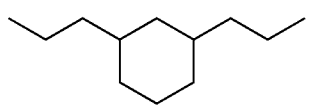

(VI)

Y in formula (1) is an epoxy group bound to the nitrogen atom either directly or through a linear alkylene group having 1-5 (more preferably 1-3, even more preferably one) carbon atoms. Such linear alkylene group is the same as that explained above with regard to X.

Symbols m and n in formula (1) are integers selected so that the total number of Y's is 3 or larger. In case where the total number of Y's is less than 3, the compound undesirably has less than three epoxy groups. In this formula (1), m is any integer of 2 to 4 (more preferably 2). In case where m is smaller than the lower limit, the crosslinking reaction tends to be insufficient. Meanwhile, in case where m is larger than the upper limit, steric hindrance tends to cause a decrease in reactivity. The multiple n's in formula (1) each independently are an integer of 1 or 2 (more preferably 2). In case where any of the multiple n's is smaller than the lower limit, the crosslinking reaction tends to be insufficient. Meanwhile, in case where any of the multiple n's is larger than the upper limit, steric hindrance tends to cause a decrease in reactivity. Furthermore, the multiple p's in formula (1) each independently are an integer of 0 or 1. The value of p indicates the number of hydrogen atoms bound to each nitrogen atom contained in formula (1). Consequently, the p and n present in each parenthesis have the following relationship: p is 1 when the number (n) of epoxy groups (Y) bound to the nitrogen atom is 1, and p is 0 when the number (n) of epoxy groups (Y) bound to the nitrogen atom is 2. Thus, the sum of the p and n which are present in each parenthesis in formula (1) is 2.

Examples of such alicyclic epoxy compound having three of more epoxy groups in the molecule include the compounds represented by the following formulae (2) and (3).

[Chem. 4]

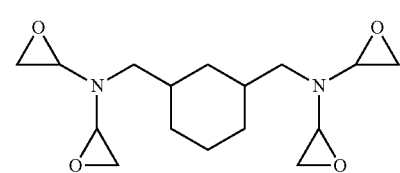

(2)

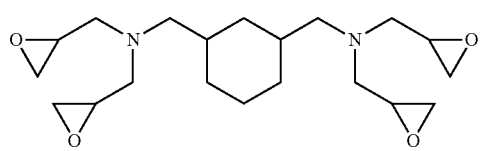

(3)

Also preferred as the nonaromatic epoxy compound are ones having an isocyanuric ring, such as triglycidyl isocyanurate (2,2,2-tri(2,3-epoxypropyl) isocyanurate), which is represented by the following formula (a).

[Chem. 5]

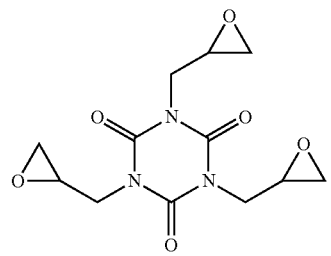

(a)

From the standpoint of the ability to impart high hydrophilicity to the porous epoxy resin particles to be obtained, the polyfunctional compound containing an epoxy group is preferably one having one or more nitrogen atoms. In particular, N,N,N',N'-tetraglycidyl-m-xylylenediamine is preferred from the standpoints of the compatibility and reactivity with the polyfunctional compound containing an amino group and the strength of the porous epoxy resin particles to be obtained. Furthermore, triglycidyl isocyanurate is preferred from the standpoints of high hydrophilicity and the availability of starting materials.

One of such polyfunctional compound containing an epoxy group may be used alone, or two or more thereof may be used in combination.

<Polyfunctional Compound Containing an Amino Group>

The polyfunctional compound containing an amino group as a starting material for the porous epoxy resin particles of the invention is an amino compound having two or more amino groups in the molecule. This compound may be either an aromatic amino compound or a nonaromatic amino compound.

Examples of the aromatic amino compound include aromatic amino compounds such as m-phenylenediamine, diaminodiphenylmethane, diaminodiphenyl sulfone, benzyldimethylamine, and dimethylaminomethylbenzene, aromatic acid anhydrides such as phthalic anhydride, trimellitic anhydride, and pyromellitic anhydride, phenol resins, phenolic novolac resins, and amino compounds having a heteroaromatic ring such as a triazine ring. Preferred are aromatic amino compounds having two or more primary amino groups in the molecule. Especially preferred are m-phenylenediamine, diaminodiphenylmethane, and diaminodiphenyl sulfone.

Examples of the nonaromatic amino compound include aliphatic amino compounds such as ethylenediamine, diethylenetriamine, triethylenetetramine, tetraethylenepentamine, iminobispropylamine, bis(hexamethylene)triamine, 1,3,6-tri saminomethylhexane, polymethylenediamine, trimethylhexamethylenediamine, and polyetherdiamines, alicyclic amino compounds such as isophoronediamine, menthanediamine, N-aminoethylpiperazine, 3,9-bis(3-aminopropyl)-2,4,8,10-tetraoxaspiro(5,5)undecane adducts, bis(4-amino-3-methylcyclohexyl)methane, bis(4-aminocyclohexyl)methane, and modifications of these, and aliphatic polyamide-amino compounds formed from a polyamino compound and a dimer acid.

Preferred of these are alicyclic amino compounds having two or more primary amino groups in the molecule, from the standpoint of attaining efficient crosslinking reaction. It is more preferred to use at least one nonaromatic amino compound selected from the group consisting of isophoronediamine, menthanediamine, bis(4-amino-3-methylcyclohexyl)methane, bis(4-aminocyclohexyl)methane, and modifications of these. Especially preferred of these are bis(4-amino-3-methylcyclohexyl)methane and bis(4-aminocyclohexyl)methane, which is represented by the following formula (b). Examples of modifications of such amines include various modifications such as modifications with epoxies, modifications with carboxylic acids, modifications with urea, modifications with ketone compounds, and modifications with silane compounds. Use can be suitably made of a modification obtained by modifying any of those alicyclic amino compounds by a known method.

[Chem. 6]

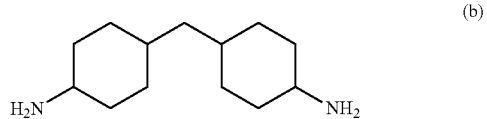

(b)

One of such polyfunctional compounds containing an amino group may be used alone, or two or more thereof may be used in combination.

<Porogen>

The porogen is a solvent in which the polyfunctional compound containing an epoxy group and the polyfunctional compound containing an amino group can dissolve and which can cause reaction-induced phase separation after the polyfunctional compound containing an epoxy group and the polyfunctional compound containing an amino group have polymerized. Examples thereof include Cellosolve compounds such as methyl Cellosolve and ethyl Cellosolve, esters such as ethylene glycol monomethyl ether acetate and propylene glycol monomethyl ether acetate, and glycols such as polyethylene glycol and polypropylene glycol. Preferred of these are polyethylene glycol having a molecular weight of about 200 to 20,000, methyl Cellosolve, ethyl Cellosolve, ethylene glycol monomethyl ether acetate, and propylene glycol monomethyl ether acetate. Especially preferred are polyethylene glycol having a molecular weight of about 200 to 20,000 and propylene glycol monomethyl ether acetate.

One of these solvents may be used alone as the porogen, or two or more thereof may be used in combination as the porogen.

<Starting-Material Mixture>

The starting-material mixture can be prepared by mixing the polyfunctional compound containing an epoxy group and the polyfunctional compound containing an amino group described above with a porogen and homogenizing the mixture.

It is preferable that the proportions of the polyfunctional compound containing an epoxy group and the polyfunctional compound containing an amino group in the starting-material mixture should be regulated so that the amount of the amino groups contained in the polyfunctional compound containing an amino group is 0.8 to 1.3 equivalents, preferably 0.8 to 1.2 equivalents, more preferably 0.9 to 1.1 equivalent, to the epoxy groups contained in the polyfunctional compound containing an epoxy group. In cases when the equivalent ratio of the polyfunctional compound containing an amino group is not less than the lower limit, the porous epoxy resin to be obtained can have a heightened crosslink density and this tends to improve the mechanical strength, heat resistance, solvent resistance, etc. Meanwhile, in cases when the equivalent ratio thereof is not higher than the upper limit, the amount of the polyfunctional compound containing an amino group which remains unreacted can be smaller. Namely, the polyfunctional compound containing an amino group tends to be inhibited from remaining unreacted in the porous epoxy resin, thereby heightening the crosslink density.

Meanwhile, the proportion of the solvent serving as a porogen, in the starting-material mixture, affects the pore diameter, pore distribution, and other properties of the porous epoxy resin particles to be obtained. Larger proportions of the porogen tend to result in larger pore diameters, while smaller proportions thereof tend to result in smaller pore diameters. Furthermore, larger proportions of the porogen tend to result in a broader pore distribution, while smaller proportions thereof tend to result in a narrower pore distribution.

The proportion of the porogen solvent in the starting-material mixture is usually preferably 50 to 500% by weight, more preferably 100 to 400% by weight, based on the sum of the polyfunctional compound containing an epoxy group and the polyfunctional compound containing an amino group contained in the starting-material mixture. In cases when the proportion of the porogen is not less than the lower limit, it is possible to form a porous structure having a higher porosity. Meanwhile, in cases when the proportion thereof is not larger than the upper limit, the porous epoxy resin to be obtained can have a porosity within an appropriate range and tends to have improved mechanical strength.

A hardening accelerator may be added to this starting-material mixture. A known compound can be suitably used as the hardening accelerator. For example, use can be made of a tertiary amine such as triethylamine or tributylamine or an imidazole compound such as 4-methyl-2-phenylimidazole, 2-ethyl-4-methylimidazole, or 4,5-dihydroxymethy-2-phenylimidazole.

Furthermore, reactive starting-material compounds other than the polyfunctional compound containing an epoxy group and the polyfunctional compound containing an amino group may be incorporated into the starting-material mixture. The reactive starting-material compounds which can be subjected to addition polymerization reaction together with the polyfunctional compound containing an epoxy group and the polyfunctional compound containing an amino group may be any compounds capable of undergoing addition polymerization together with the polyfunctional compound containing an epoxy group and the polyfunctional compound containing an amino group, and are not particularly limited. Examples thereof include one or more of the compounds which will be shown later as starting-material monomers for the (co)polymer constituting porous resin particles for the separating medium according to the second aspect of the present invention. However, from the standpoint of effectively obtaining the merits inherent in porous epoxy resins, such as impact resistance, chemical resistance, durability, handleability, and production efficiency, it is preferable that the proportion of the reactive starting-material compounds other than the polyfunctional compound containing an epoxy group and the polyfunctional compound containing an amino group should be 30% by weight or less, in particular, 0-15% by weight, based on all the reactive starting-material compounds.

Methods for preparing the starting-material mixture are not particularly limited. Use may be made of a method in which the polyfunctional compound containing an epoxy group, the polyfunctional compound containing an amino group, and the porogen are mixed together at ordinary temperature or with heating. Alternatively, use may be made of a method in which a mixture of the polyfunctional compound containing an epoxy group and the polyfunctional compound containing an amino group is added to the porogen and is mixed therewith or dissolved therein.

<Surfactant (Dispersant)>

As the surfactant for emulsion formation, any surfactant may be used without particular limitations so long as the surfactant is miscible with the starting-material mixture and capable of forming a stable emulsion. Examples thereof include anionic surfactants, cationic surfactants, nonionic surfactants, and block copolymers composed of a hydrophilic block and a hydrophobic block, such as, for example, a block copolymer composed of a poly(acrylic acid) block and a poly(acrylic ester) block, a block copolymer composed of a poly(oxyethylene) block and a poly(acrylic ester) block, and a block copolymer composed of a poly(oxyethylene) block and a poly(oxypropylene) block. The surfactant is not particularly limited in the molecular weight thereof, and either a low-molecular-weight compound or a high-molecular-weight compound can be used.

Examples of the anionic surfactants include fatty acid salts, sulfuric acid ester salts of higher alcohols, phosphoric acid ester salts of fatty alcohols, alkylallylsulfonic acid salts, and formalin-condensed naphthalenesulfonic acid salts. Examples of the cationic surfactants include primary alkylamine salts, secondary alkylamine salts, tertiary alkylamine salts, quaternary alkylammonium salts, and pyridinium salts. Examples of the nonionic surfactants include poly(oxyethylene) alkyl ethers, poly(oxyethylene) alkylphenyl ethers, poly(oxyethylene) alkyl esters, sorbitan alkyl esters, and poly(oxyethylene) sorbitan alkyl esters. Examples of the polymeric surfactants include partially saponified poly(vinyl alcohol), starch, methyl cellulose, carboxymethyl cellulose, hydroxyethyl cellulose, and partially saponified poly(methacrylic acid).

By selecting the surfactant to be used, the porous epoxy resin particles to be obtained can be controlled with respect to the average particle diameter, particle size distribution, and aggregated state of the particles. For example, by using an anionic surfactant, cationic surfactant, or nonionic surfactant, the porous epoxy resin particles can be made to have a reduced average particle diameter and a narrowed particle size distribution. By using a polymeric surfactant, the average particle diameter can be made larger and particle aggregation can be inhibited. In particular, in cases when a block copolymer composed of a hydrophilic block and a hydrophobic block is used as a surfactant, the addition thereof in a small amount suffices for emulsification, enabling the solution to retain a low viscosity during the polymerization reaction. This facilitates the stirring. Use of the block copolymer is hence preferred.

One of these surfactants may be used alone, or two or more thereof may be used in combination.

In the case of using an aqueous solution of a surfactant, the concentration of the surfactant is preferably about 0.5 to 10% by weight, in particular, about 1 to 5% by weight. In cases when the surfactant concentration in the aqueous surfactant solution is not lower than the lower limit, control of particle diameter is easy and aggregation during the polymerization can be inhibited. In cases when the surfactant concentration is not higher than the upper limit, it is possible to inhibit bubbling and viscosity increase during the polymerization, rendering the production easy.

Meanwhile, in the case of using a block copolymer as the dispersant, a generally known dispersion medium can be used. Examples thereof include: alcohols such as γ-butyrolactone, glycerin, ethylene glycol, 1,2-propanediol, 1,3-propanediol, 1,2-butanediol, 1,3-butanediol, and n-butanol; hydrocarbons such as toluene, xylene, n-octane, and n-dodecane; fatty acids such as linoleic acid; alcohols such as polyethylene glycol, dimethyl silicone, methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethylbutanol, 1-heptanol, 2-heptanol, 3-heptanol, 2-octanol, 2-ethyl-1-hexanol, benzyl alcohol, and cyclohexanol; ether alcohols such as methyl Cellosolve, ethyl Cellosolve, isopropyl Cellosolve, butyl Cellosolve, and diethylene glycol monobutyl ether; ketones such as acetone, methyl ethyl ketone, methyl isobutyl ketone, and cyclohexanone; esters such as ethyl acetate, butyl acetate, ethyl propionate, and Cellosolve acetate; aliphatic or aromatic hydrocarbons such as pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexyl, benzene, toluene, xylene, and ethylbenzene; halogenated hydrocarbons such as carbon tetrachloride, trichloroethylene, chlorobenzene, and tetrabromoethane; ethers such as ethyl ether, dimethyl ether, trioxane, and tetrahydrofuran; acetals such as methylal and diethyl acetal; fatty acids such as formic acid, acetic acid, and propionic acid; and sulfur- or nitrogen-containing organic compounds such as nitropropene, nitrobenzene, dimethylamine, monoethanolamine, pyridine, dimethylformamide, and dimethyl sulfoxide. Preferred examples include water-soluble or hydrophilic medium such as lower alcohols, e.g., methanol and ethanol, ether alcohols, e.g., methyl Cellosolve and ethyl Cellosolve, mixtures of water and a lower alcohol, and mixtures of water and an ether alcohol, and further include toluene, dimethylformamide (DMF), tetrahydrofuran (THF), methyl ethyl ketone (MEK), methyl isobutyl ketone (MIBK), acetone, N-methyl-2-pyrrolidone (NMP), dichloromethane, and tetrachloroethylene. One of these dispersion medium may be used alone, or two or more thereof may be used in combination. The concentration of the block copolymer in the dispersion medium is preferably about 0.5 to 15% by weight, in particular, about 1 to 10% by weight.

<Addition Polymerization Reaction>

The addition polymerization reaction of the polyfunctional compound containing an epoxy group with the polyfunctional compound containing an amino group is conducted by mixing the starting-material mixture with a surfactant (dispersant) to bring the starting-material mixture into a stable emulsified state and then heating the resultant mixture for a given time period with stirring.

Emulsified states in the case of forming an emulsion composed of water and an oil include the oil-in-water (O/W type) emulsion, in which oil droplets are dispersed in the water, and the water-in-oil (W/O type) emulsion, in which water droplets are dispersed in the oil. An oil-in-oil (O/O type) emulsion composed of incompatible oils can also be advantageously used. An emulsified state can be selected in accordance with the polyfunctional compound containing an epoxy group, polyfunctional compound containing an amino group, and porogen to be used. However, the oil-in-oil type is suitable from the standpoint of the hydrophilicity and water solubility of the porogen.

It is preferred to use the surfactant (dispersant) in an amount of about 1 to 20% by weight, in particular, about 2 to 10% by weight, based on the total amount of the polyfunctional compound containing an epoxy group, polyfunctional compound containing an amino group, and porogen. The amount of the surfactant to be used affects the average particle diameter, particle size distribution, and particle aggregation of the porous epoxy resin particles to be obtained. In cases when the surfactant is used in a large amount, it is possible to control the average particle diameter, particle size distribution, and particle aggregation. In cases when the surfactant amount is small, bubbling and the viscosity tend to be inhibited or kept low. Consequently, in cases when the use amount of the surfactant is not less than the lower limit, the starting-material mixture can be evenly emulsified, making it possible to attain a narrow particle size distribution range and to inhibit particle aggregation. In cases when the amount thereof is not larger than the upper limit, it is possible to inhibit bubbling and viscosity increase, rendering the production easy.

The rate of stirring during the addition polymerization reaction affects the particle diameter of the porous epoxy resin particles to be obtained. In general, high stirring rates tend to give porous epoxy resin particles having a reduced particle diameter, while low stirring rates tend to give porous epoxy resin particles having an increased particle diameter. In cases when the stirring rate is moderately high, the emulsion is inhibited from suffering phase separation, etc., making it possible to obtain porous epoxy resin particles having evenness in particle diameter. In cases when the stirring rate is moderately low, the particle diameter is prevented from becoming too small and bubbling can be inhibited. It is hence preferred to suitably regulate the stirring rate in the range of 30 to 800 rpm, in particular, 50 to 400 rpm, although the stirring rate varies depending on the heating temperature, reaction scale, the amounts of the porogen and surfactant used, etc.

The heating temperature during the addition polymerization reaction affects the pore diameter of the porous epoxy resin particles to be obtained. In general, high heating temperatures tend to give porous epoxy resin particles having a reduced pore diameter, while low heating temperatures tend to give porous epoxy resin particles having an increased pore diameter. In cases when the heating temperature is moderately high, the addition polymerization reaction proceeds smoothly. In cases when the heating temperature is moderately low, the reaction rate is prevented from becoming too high, making it possible to satisfactorily form a porous structure. It is hence preferred to suitably regulate the heating temperature in the range of 40 to 120° C., in particular, 60 to 90° C., although the heating temperature varies depending on the stirring rate, the amounts of the porogen and surfactant used, etc.

The period of the addition polymerization reaction affects the conversion to the porous epoxy resin particles to be obtained. In general, long reaction periods tend to result in a high conversion and a small amount of unreacted materials and hence in enhanced mechanical strength, while short reaction periods tend to result in a low conversion and a large amount of unreacted materials and hence in reduced mechanical strength. In cases when the reaction period is moderately long, the addition polymerization reaction proceeds sufficiently, making it possible to form the desired porous structure. In cases when the reaction period is moderately short, it is possible to diminish the possibility of, for example, fracture due to stirring. It is hence preferred to suitably regulate the reaction period in the range of 1 to 12 hours, in particular, 2 to 6 hours, although the reaction period varies depending on the stirring rate, heating temperature, the amounts of the porogen and surfactant used, etc.

The addition polymerization reaction is conducted under such conditions in the emulsion obtained by evenly mixing the starting-material mixture with a surfactant (dispersant) by stirring. This addition polymerization reaction can hence proceed in the individual emulsion droplets of the starting-material mixture within the emulsion while maintaining a co-continuous structure formed between the porogen and the reaction system including the polyfunctional compound containing an epoxy group and the polyfunctional compound containing an amino group, thereby yielding a particulate porous epoxy resin having a three-dimensional network backbone structure of the non-particle-aggregation type.

After the addition polymerization reaction, the particulate porous epoxy resin yielded is taken out by filtration. This resin is washed with, for example, water to remove the surfactant, porogen, and unreacted materials. Thus, porous epoxy resin particles of the invention can be obtained.

It is preferable that the porous epoxy resin particles of the invention should be spherical, rather than having any other particulate shapes. In particular, the closer to complete sphere, the more the particles are preferred. The spherical shape makes it easy to increase the number of theoretical plates in packing into a column, thereby improving the separating properties. The closer to complete sphere, the larger the number of theoretical plates and the more the separating properties improve. Since the porous epoxy resin particles produced by the process described above are ones yielded in an emulsion which was kept being stirred, these resin particles usually have a particulate shape close to complete sphere. These porous epoxy resin particles have an average pore diameter of preferably 10 to 2,000 nm and an average particle diameter of preferably 1 to 1,000 μm.

[Treatment of the Porous Epoxy Resin Particles]

The separating medium according to the first aspect of the present invention is characterized by being obtained by treating the porous epoxy resin particles produced in the manner shown above.

The treatment of the porous epoxy resin particles is preferably a treatment that improves the property of the porous epoxy resin particles which separates a desired substance (selectively adsorbing property) and that reduces the nonspecific adsorption properties. Examples thereof include treatments such as surface hydrophilization, surface hydrophobization, functional-group introduction, biomolecule introduction, classification, organic-solvent washing, and alkali washing.

Treatments such as hydrophilization, hydrophobization, and functional-group introduction involve impartation of any different chemical structure into a surface layer of the particles. Whether such a treatment has been performed can hence be ascertained by comparing the chemical structure of the surface layer with that of a section. For example, whether a treatment has been performed can be ascertained by examining the particle by solid nuclear magnetic resonance spectroscopy (solid NMR), infrared spectroscopy (IR), X-ray photoelectron spectroscopy (XPS), or the like. Only one of those treatments may be performed, or a plurality of treatments may be selected and performed in combination.

<Surface Hydrophilization Treatment>

Examples of the surface hydrophilization treatment include a treatment in which one or more compounds having a hydroxyl group and/or an amino group are add to epoxy groups remaining in the surface of the porous epoxy resin particles, thereby opening the rings of the epoxy groups. Examples of the compounds having a hydroxyl group and/or amino group for use in this treatment include one or more compounds selected from among sulfuric acid, phosphoric acid, water, sodium hydroxide, potassium hydroxide, ammonia, ethanolamine, aminomethylpropanol, ethylene glycol, propylene glycol, glycerin, polyethylene glycol, and the like. The hydrophilization treatment can be conducted by bringing any of these compounds into contact with the porous epoxy resin particles. The functional groups introduced by the hydrophilization treatment may be subjected to the same hydrophilization treatment. Two or more of those compounds may be used in combination to treat the porous epoxy resin particles. Specific examples of the treatment include a method in which the porous epoxy resin particles are added to an about 1 to 50% by weight aqueous solution of a compound for hydrophilization and the resultant mixture is stirred with heating at 10 to 90° C. for 1 to 24 hours, as will be described in the Examples later. After the hydrophilization treatment, the porous epoxy resin particles are taken out by filtration and washed with water to remove the remaining compound for hydrophilization.

By performing the hydrophilization treatment, the dispersibility of the particles in water is improved and the nonspecific adsorption of hydrophobic substances is reduced. The surface hydrophilization can be evaluated, for example, by examining the nonspecific-adsorption amount which will be described later, as an index.

<Surface Hydrophobization Treatment>

Examples of the surface hydrophobization treatment include a method in which one or more compounds having a hydrophobic group is added to epoxy, amino, or other groups remaining in the surface of the porous epoxy resin particles, thereby hydrophobized the surface. Examples of the compounds for use in this hydrophobization treatment include one or more compounds selected from among alcohols such as methanol, ethanol, and propanol, alkyl chlorides such as methyl chloride, ethyl chloride, butyl chloride, and benzyl chloride, and the like. The hydrophobization treatment can be conducted, for example, by dispersing the porous epoxy resin particles in a solution containing a compound for hydrophobization and stirring the mixture with heating at 10 to 90° C. for 1 to 6 hours. After the hydrophobization treatment, the porous epoxy resin particles are taken out by filtration and washed with water to remove the remaining compound for hydrophobization.

By performing the hydrophobization treatment, the adsorption of hydrophobic substances can be enhanced. The treated particles can tenaciously hold a substance to be separated, under common evaluation conditions for reversed-phase chromatography. The treated particles are hence useful, for example, in separating a highly hydrophobic substance.

The surface hydrophobization can be evaluated by determining the retention time for a hydrophobic substance such as dipropyl phthalate, as an index.

<Functional-Group Introduction Treatment>

Examples of the functional-group introduction treatment include a grafting treatment in which a water-soluble polymer having ionic functional groups is added to the porous epoxy resin particles through epoxy and/or amino groups remaining in the surface of the particles.

The water-soluble polymer having ionic functional groups (hereinafter sometimes referred to as "ionic water-soluble polymer") to be added to the porous epoxy resin particles in the grafting treatment preferably is one having primary hydroxyl groups. Either a natural polymer or a synthetic polymer can be used. After an ionic water-soluble polymer has added to the porous epoxy resin particles, an interactive functional group may be further introduced. In this case, it is preferable that this ionic water-soluble polymer should have a functional group capable of combining with the interactive functional group, besides the primary hydroxyl groups, which are bound to the porous epoxy resin particles by covalent bonding. Examples of the functional group capable of combining with the interactive functional group include a secondary hydroxyl group, tertiary hydroxyl group, carboxyl group, amino group, sulfo group, isocyanate group, halogen radicals such as chlorine radical, and epoxy group.

The functional group which has been introduced can be ascertained by the analytical method mentioned above, i.e., solid NMR, IR, XPS, etc. Alternatively, the introduction of the functional group can be ascertained by titration with an acid, alkali, etc.

The ionic water-soluble polymer more preferably is a natural or synthetic polymer having a plurality of hydroxyl groups. Examples of the natural polymer include agarose, chitosan, glucomannan, and modified celluloses such as hydroxypropyl cellulose and carboxymethyl cellulose. Examples of the synthetic polymer include: polyglycerin, polyglycidol, polyether polyols such as allyl glycidyl ether/glycidol copolymers, (co)polymers of one or more primary-hydroxyl-group-containing monovinyl monomers such as hydroxyalkyl (meth)acrylates, e.g., hydroxyethyl (meth) acrylate and 2,3-dihydroxypropyl (meth)acrylate, hydroxyalkyl vinyl ethers, e.g., hydroxyethyl vinyl ether and hydroxybutyl vinyl ether, and alkylolacrylamides, e.g., methylolacrylamide and hydroxyethylacrylamide, and copolymers of one or more of such primary-hydroxyl-group-containing monovinyl monomers with one or more of monovinyl monomers containing other functional groups. The monovinyl monomers containing other functional groups may be ones which contain an interactive functional group or contain a functional group capable of introducing an interactive functional group through an after reaction. These monovinyl monomers are also preferred.

Of those polymers, the synthetic polymers are more preferred for use as the ionic water-soluble polymer. The reason for this is, for example, that synthetic polymers usually have higher purity than natural polymers and this facilitates control of the addition reaction with the porous epoxy resin particles.

The molecular weight of the ionic water-soluble polymer is not particularly limited. However, the molecular weight thereof is usually 100 or higher, preferably 200 or higher, more preferably 250 or higher, and is usually 5,000,000 or less, preferably 1,000,000 or less, more preferably 600,000 or less. In case where the molecular weight of the ionic water-soluble polymer is too low, the addition of this polymer to the porous epoxy resin particles tends to be less effective in improving adsorption amount. Meanwhile, in case where the molecular weight thereof is too high, this ionic water-soluble polymer which has added occupies a large proportion of the pore spaces of the porous epoxy resin particles, resulting in limited room for a high-molecular-weight substance to be separated, such as a protein, to diffuse or infiltrate into the pore spaces.

The amount in which the ionic water-soluble polymer is added to the porous epoxy resin particles may be as follows. The degree of addition, which is calculated using the following equation from the weight $W_0$ of the porous epoxy resin particles of before addition of the ionic water-soluble polymer thereto and the weight $W_1$ of the separating medium obtained by causing the ionic water-soluble polymer to add to the porous epoxy resin particles and dried to a constant weight by vacuum drying or another method, is usually preferably 0.1 to 30%, especially preferably 0.5 to 20%.

$$\text{Degree of addition} = \{(W_1 - W_0)/W_0\} \times 100$$

In case where the degree of addition is too low, the grafting of the ionic water-soluble polymer onto the porous epoxy resin particles cannot sufficiently produce the effect of improving adsorption amount. In case where the degree of addition is too high, the ionic water-soluble polymer which has added occupies a large proportion of the pore spaces of the porous epoxy resin particles, resulting in limited room for a high-molecular-weight substance to be separated, such as a protein, to diffuse or infiltrate into the pore spaces.

A method for causing an ionic water-soluble polymer to add to the porous epoxy resin particles is as follows. For example, in the case where an ionic water-soluble polymer is added, by covalent bonding, to the porous epoxy resin particles having epoxy groups in the surface thereof, the addition reaction can be conducted using either an alkali catalyst or an acid catalyst or without any catalyst.

As a solvent for the addition reaction, use can be made of any of organic solvent systems, organic solvent/water mixed solvent systems, and water systems so long as the ionic water-soluble polymer can be dissolved therein. A reaction temperature and a reaction time can be suitably selected on the basis of known reaction conditions. For example, in the case of porous epoxy resin particles having epoxy groups in the surface, the reaction temperature is usually 0 to 200° C. and the reaction time is usually 1 minutes to 60 hours.

After the ionic water-soluble polymer has added to the porous epoxy resin particles, the functional groups which are capable of combining, by covalent bonding, with hydroxyl groups and which remain in the surface of the porous epoxy resin particles may be converted, by, for example, hydrolysis to groups capable of combining with interactive functional groups.

Although interactive functional groups may be further introduced after the addition of an ionic water-soluble polymer to the porous epoxy resin particles, use may be made of an ionic water-soluble polymer into which an interactive functional group has been introduced beforehand.

The interactive functional group may be suitably determined in accordance with uses of the separating medium of the invention. For example, for use as a separating medium for liquid chromatography, the interactive functional group may be suitably selected from various ion-exchange groups and hydrophobic interactive groups. In the case of separating a protein using the separating medium of the invention, any of those interactive functional groups is suitably selected in accordance with the protein to be separated. This brings about the excellent ability to adsorb the protein.

Examples of the ion-exchange groups include carboxyl groups such as carboxymethyl, sulfonoalkyl groups such as sulfonoethyl, sulfoalkyl groups such as sulfoethyl, sulfopropyl, and 2-methylpropanesulfo, various alkylamino groups such as alkylamino groups, dialkylamino groups, and trialkylammonium groups, and a pyridine group.

Examples of the hydrophobic interactive groups include alkyl groups having 1-40 carbon atoms, a phenyl group, and poly(alkyl ether) groups in which the alkyl group has 1-10 carbon atoms and the number of repetitions is 2 to 100. Preferred examples include alkyl groups having 4 to 18 carbon atoms, a phenyl group, and poly(alkyl ether) groups in which the alkyl group has 2 to 4 carbon atoms and the number of repetitions is 2 to 20.

The separating medium of the invention may have only one of these interactive functional groups, or may have two or more thereof.

For introducing interactive functional groups, use may be made of a method in which a compound having any of the interactive functional groups shown above is reacted with the porous epoxy resin particles to which an ionic water-soluble polymer has added. It is preferable that the compound which has an interactive functional group and is to be reacted with the porous epoxy resin particles to which an ionic water-soluble polymer has added should be a compound that reacts with the hydroxyl groups, carboxyl groups, amino groups, sulfo groups, isocyanate groups, halogen radicals, e.g., chlorine radicals, epoxy groups, or the like of the porous epoxy resin particles to which the ionic water-soluble polymer has added.

One of such compounds may be used alone, or two or more thereof may be used as a mixture thereof.

There are no particular limitations on modes of reaction in which any of those interactive functional groups is introduced by reacting a compound having the interactive functional group with the porous epoxy resin particles to which an ionic water-soluble polymer has added. In general, the following method may be used. A compound having an interactive functional group is dissolved in a solvent capable of dissolving therein the compound having an interactive functional group. To the resultant reactant solution are added the porous epoxy resin particles to which an ionic water-soluble polymer has added. This mixture is heated at a given temperature for a given period to react the compound.

In the separating medium of the invention thus produced, the amount of the interactive functional groups introduced thereinto may be as follows. In the case where the interactive functional groups are, for example, ion-exchange groups, the ion-exchange capacity of the separating medium is preferably 0.001 to 4 equivalent(s)/L-(separating medium particles), especially preferably 0.01 to 2 equivalent/L-(separating medium particles).

In the case where the interactive functional groups are hydrophobic groups, the amount thereof is preferably 0.001 to 2 equivalent/L-(separating medium particles).

<Biomolecule Introduction Treatment>

Examples of the biomolecule introduction treatment include a coupling treatment in which a protein and/or a protein derivative is added to the porous epoxy resin particles through epoxy and/or amino groups remaining in the surface of the particles. The coupling treatment may be conducted, after the grafting treatment, by causing a protein and/or a protein derivative to add to the particles.

Examples of the biomolecules to be introduced include proteins and/or protein derivatives, nucleic acids, polysaccharides, lipids, and vitamins. Especially preferred are proteins and/or protein derivatives. More preferred of these biomolecules are affinity ligands which specifically combine with specific substances.

The biomolecules which have been introduced can be ascertained by the analytical method mentioned above, i.e., solid NMR, IR, XPS, etc. Alternatively, analysis for the introduced biomolecules can be made, for example, through protein assay by the bicinchoninic acid (BCA) method or Bradford method.

In the separating medium of the invention thus produced, the amount of the biomolecules introduced thereinto, in the case of an affinity ligand, is preferably 1μ equivalent/L-(separating medium particles) to 2 equivalent/L-(separating medium particles).

Examples of the affinity ligand include protein A, protein G protein L, functional modifications of these proteins, various antibodies, pseudopeptide ligands of these, various pigments, lectins, and nucleic acids including oligonucleic acids. However, for use in protein separation applications, any affinity ligand may be used without particular limitations so long as the ligand is a substance having biochemical activity and an affinity for proteins and is capable of adding to the porous epoxy resin particles and/or to the ionic water-soluble polymer.

In particular, in the case where the separating medium is primarily intended for antibody separation, preferred ligands are ones capable of specifically combining with some immunoglobulins. Preferred of these are protein A, protein G, protein L, and modifications of these. In particular, modifications of protein A, which attain high selectivity when used for antibody separation, are preferred.

Methods for introducing the affinity ligand into the porous epoxy resin particles are explained below in more detail.

For introducing an affinity ligand into the porous epoxy resin particles, use can be made of: a method in which a polymerizable monomer having the property of imparting a reactive functional group is first incorporated into the porous epoxy resin particles, for example, by copolymerization and this reactive functional group is directly reacted with the functional group of the ligand; and a method in which the ligand is bound to the porous epoxy resin particles through a low-molecular-weight or high-molecular-weight compound having in the molecule one or more functional groups reactive with the functional group of a component of the porous epoxy resin particles and one or more functional groups reactive with the functional group of the ligand (such low-molecular-weight and high-molecular-weight compounds are hereinafter inclusively referred to as "spacers").

For example, in the case of immobilizing a ligand having amino groups, such as protein A, examples of the former method include a method in which functional groups that form covalent bonds with amino groups, such as epoxy or carboxyl groups, are first introduced into the porous epoxy resin particles and protein A is directly reacted with these functional groups and immobilized thereby. It is also possible to immobilize protein A using the epoxy groups remaining on the porous epoxy resin particles.

Examples of the latter method include: a method in which an amino acid (aminocarboxylic acid) compound is used as a spacer to first react the amino group moiety thereof with an epoxy group of a porous epoxy resin particle and the carboxyl group at another end is reacted with an amino group of protein A; and a method in which a diamine or diol and a diglycidyl compound, e.g., (poly)ethylene glycol diglycidyl ether, are successively used as a spacer in such a manner that one end of the diamine or diol is bound to an epoxy group of a porous epoxy resin particle, the other end is bound to one of the epoxy groups of the diglycidyl compound, and the remaining terminal epoxy group is bound to protein A.

Examples of the diamine to be used as one component of the spacer in the method shown above include aliphatic diamines such as tetramethylenediamine and hexamethylenediamine. Examples of the diol include aliphatic diols, such as propylene glycol, butanediol, diethylene glycol, and triethylene glycol, and polyethylene glycols.

It is preferable that the spacer should have a linear structure, from the standpoints of reactivity with the ligand and of steric hindrance relationship with the porous epoxy resin particles during immobilization. In case where a spacer having a branched structure is used, the adsorption amount tends to decrease probably because the enhanced steric hindrance inhibits affinity bond formation between the ligand and an antibody.

It is considered that selectivity for an antibody to be separated is affected by the distance between the ligand, e.g., protein A, bound to the inside of each of pores of the porous epoxy resin particles and the pore wall. In the former method, that distance is undesirably determined in the stage of producing the porous epoxy resin particles, by the kind of the polymerizable monomer to be copolymerized which has the property of imparting a monomer-reactive functional group. In contrast, the latter method is preferred in that that distance can be regulated in the stage of ligand immobilization, by selecting the kind of spacer or a combination of spacer components.

In performing a ligand immobilization reaction, protein A, for example, is supplied as an aqueous solution to the surface of the porous epoxy resin particles and reacted.

The temperature for the immobilization reaction is preferably from ordinary temperature to about 30° C. Too high temperatures may inactivate the protein A, etc. Meanwhile, too low temperatures may require a prolonged period for the reaction.

The ligand immobilization density is preferably 1 g or higher per L of the separating medium. The ligand immobilization density is usually 50 g/L or less, although there is no particular upper limit on the density.

In case where the ligand immobilization density is less than 1 g/L, the amount of an antibody which can be adsorbed is smaller, resulting in a decrease in the efficiency of the separating medium. Meanwhile, even when a ligand is immobilized in an amount exceeding 50 g/L, this results in a decrease in the efficiency of ligand utilization.

From the standpoint of the ligand immobilization density, it is preferable that the content of functional groups (e.g., epoxy groups) for ligand immobilization should be 0.01 to 100μ equivalent (epoxy micro-equivalents) per mL of the porous epoxy resin particles. In case where the value thereof is less than 0.01μ equivalent, not only a decrease in ligand immobilization amount results but also there are cases where ligand immobilization weakens and some of the ligand is detached and released. Meanwhile, in case where the content thereof exceeds 100μ equivalent, the antibody adsorption amount tends to decrease probably due to the inhibition of ligand lability.

A more preferred range of the immobilization density is 0.05-50μ equivalent (epoxy micro-equivalents) per mL of the porous epoxy resin particles.

After the immobilization reaction thus performed, it is preferable that the reactive functional groups remaining on the porous epoxy resin particles should be inactivated by a post-treatment. Any reactive functional groups remaining without being inactivated may gradually react with the ligand, e.g., protein A, to reduce the adsorption capacity of the separating medium or impair the selectivity.

Examples of the post-treatment, for the case where the reactive functional groups are, for example, epoxy groups, include a method in which the epoxy groups are reacted with an aqueous solution of an amine, e.g., ethanolamine, and thus inactivated. There are no particular limitations on the conditions for this treatment, including the concentration of ethanolamine and pH. Usually, the treatment can be performed under the conditions of a concentration of 0.1 to 5 mol/L and a pH of 7 to 14. Conditions within such ranges enable the ethanolamine to react at a rate within a practical range and inhibit the protein A from being deactivated. Such conditions are hence preferred. More preferred treatment conditions include a concentration of 1 to 2 mol/L and a pH of 8 to 9.

It is preferable that the separating medium which has undergone the ligand immobilization reaction or which has undergone the post-treatment besides the immobilization reaction should be washed with water in order to remove the unreacted substances. It is more preferred to conduct the washing by alternately using acidic washing water and basic washing water. It is even more preferred to alternately use two buffer solutions, i.e., an acidic buffer solution having a pH of 0 to 5 and a basic buffer solution having a pH of 8 to 15, to conduct the washing. This washing can not only remove excess protein A or the like but also activate the protein A which has been immobilized.

The acidic buffer solution, of the buffer solutions usable for the washing, may be hydrochloric acid/potassium chloride, tartaric acid, citric acid, glycine, formic acid, acetic acid, succinic acid, phosphoric acid, or a salt of any of these. The basic buffer solution may be one which contains triethanolamine, tris(hydroxymethyl)aminomethane, diethanolamine, boric acid, ammonia, carbonic acid, or a salt of any of these.

The ionic strength of each buffer solution to be used is preferably 0.001 to 10 M, more preferably 0.01 to 2 M. Use of buffer solutions having an ionic strength within that range is preferred because this is effective in diminishing the deactivation of the immobilized protein A. The buffer solutions to be used may contain a salt such as sodium chloride or potassium chloride. The presence of such a salt is preferred since the salt enables the removal of excess protein A or the like and the activation of the immobilized protein A to be effectively conducted. The concentration of sodium chloride or potassium chloride is usually 0.1 to 2 M, preferably 0.5 to 1 M.

The separating medium obtained is temporarily stored except for the case where the separating medium is used as such. As a medium for the storage, it is preferred to use an aqueous ethanol solution having a concentration of 1 to 50% by weight. By regulating the ethanol concentration so as to be within that range, the deactivation of the immobilized protein A can be reduced.

During the storage of the separating medium, which includes porous particles of the porous epoxy resin particles, in the storage medium, the separating medium comes to have an appropriate degree of swelling. In addition, since the storage medium has a satisfactory affinity for the separating medium, the storage produces the effect of inhibiting the growth of bacteria and the effect of enhancing the storage stability of the protein A immobilized in the pores. This storage is hence preferred. The concentration of ethanol is more preferably 10 to 30% by weight, even more preferably 15 to 25% by weight.

<Classification Treatment>

Examples of the classification treatment of the porous epoxy resin particles include a method in which the porous epoxy resin particles are classified by a known technique, such as dry classification, e.g., gravity classification or inertial classification, wet classification, e.g., sedimentation classification or hydraulic classification, or classification by sieving, thereby obtaining porous epoxy resin particles having a desired particle diameter and a desired particle size distribution.

The separating medium obtained by classifying the porous epoxy resin particles has an average particle diameter of preferably 1 to 1,000 µm and an evenness factor [(particle diameter at cumulative percentage of 40%)/(particle diameter at cumulative percentage of 90%)] of preferably 1.6 or less. The evenness factor is more preferably 1.4 or less, even more preferably 1.2 or less.

<Organic-Solvent Washing>

Examples of the organic solvent for use in the organic-solvent washing of the porous epoxy resin particles include one or more of alcohols such as methanol, ethanol, and isopropyl alcohol, ketones such as acetone and methyl ethyl ketone, aromatics such as toluene and xylene, and the like. The organic-solvent washing can be conducted, for example, by adding the porous epoxy resin particles to an organic solvent used in an amount 1 to 10 times by volume the amount of the particles and stirring the mixture for about 1 to 5 hours. During this washing, the mixture may be heated to about 40 to 100° C. according to need. Organic-solvent washing may be repeatedly conducted multiple times, and different organic solvents may be used therefor. After the washing with an organic solvent, it is preferred to remove the organic solvent by water washing.

The surfactant (dispersant), porogen, and other substances used for synthesizing the porous epoxy resin particles can be removed by the organic-solvent washing. Such substances remaining in or on the porous epoxy resin particles may cause nonspecific adsorption when the particles are used as a separating medium, or may come as impurities into a substance being separated by elution. It is hence preferred to remove such substances by washing beforehand.

<Alkali Washing>

As the alkali for the alkali washing of the porous epoxy resin particles, it is preferred to use an inorganic alkali such as sodium hydroxide, potassium hydroxide, or calcium hydroxide. These alkalis can be used as an aqueous solution having a concentration of about 0.1 to 10% by weight. The alkali washing can be conducted, for example, by adding the porous epoxy resin particles to an aqueous alkali solution used in an amount 1 to 10 times by volume the amount of the particles and stirring the mixture for about 1 to 5 hours. During this washing, the mixture may be heated to about 40 to 100° C. according to need. Alkali washing may be repeatedly conducted multiple times, and different alkalis may be used therefor. After the washing with an alkali, it is preferred to remove the alkali by water washing.

Washing the porous epoxy resin particles with an alkali can hydrolyze any sites where incomplete bonds having poor alkali resistance, such as ester bonds and hydrogen bonds, have formed. The porous epoxy resin particles can hence have stabilized performances required of separating medium. In cases when the porous resin particles are used as a separating medium, an alkali washing step is usually involved. By subjecting the porous epoxy resin particles to alkali washing beforehand, the particles are made to show stable performances when repeatedly used as a separating medium. The alkali washing is hence preferred.

<Drying>

The porous epoxy resin articles may by subjected to drying in producing a separating medium, although the drying is not essential. Examples of the drying include a method in which the porous epoxy resin particles are dried by a treatment with a vacuum dryer, drying machine, freeze dryer, or the like at a temperature of −20 to 120° C. and a pressure 1-100 kPa for about 1-12 hours, thereby removing 95% or more of the water possessed by the porous epoxy resin particles.

[Properties of the Separating Medium]

The separating medium according to the first aspect of the invention satisfies the following (i) and/or (ii). These properties mean that the surface of the porous epoxy resin particles, which constitute the separating medium, has pores therein in an amount sufficient for liquid chromatography applications. The separating medium may satisfy either or both of these.

(i) To have an average pore diameter of 10 to 2,000 nm.
(ii) To have a water content of 50% by weight or higher.

<Average Pore Diameter>

The separating medium of the invention is characterized by having pores extending through each particle to the surface thereof. This can be ascertained by examining the particle surface and a section with a scanning electron microscope (SEM). In the case where the pore diameters can be measured by a mercury intrusion method, the presence of pores extending to the particle surface can be ascertained. The presence of such pores can be more precisely ascertained by conducting the microscopic examination and the pore diameter measurement in combination. The mercury intrusion method is a method in which mercury is intruded into open voids by applying a pressure, and the diameters of the pores, which are assumed to be cylindrical, are calculated from the pressure value and the corresponding volume of the intruded mercury using the Washburn equation. This measurement can be made in accordance with JIS R1655, which is for shaped ceramic objects.

The average pore diameter of the separating medium of the invention is preferably in the range of 10 to 2,000 nm, more preferably 100 to 1,000 nm, even more preferably 200 to 500 nm.

In cases when the average pore diameter thereof is not less than the lower limit, a substance to be separated, such as, for example, a protein, is apt to come into the pores of the particles and this tends to result in an improvement in adsorption amount. Meanwhile, in cases when the average pore diameter thereof is not larger than the upper limit, it is possible to reduce the amount of spaces within the pores which do not contribute to adsorption, and this tends to improve the adsorption amount and to further improve the mechanical strength of the particles.

The average pore diameter of the separating medium of the invention is determined by the method which will be described later in the Examples.

The average pore diameter of the separating medium can be controlled by regulating the proportions of constituent units of the porous epoxy resin particles, ratio of mixing with the porogen, heating temperature during the mixing, etc. in producing the porous epoxy resin particles.

<Water Retention>

The separating medium of the invention has a water retention of preferably 50% by weight or higher, more preferably 60% by weight or higher, even more preferably 70% by weight or higher. For use in separating a substance having a large molecular size, the water retention of the separating medium is especially preferably 75% by weight or higher. The term "water retention of a separating medium" means the amount of water which can be held in the pores and any other spaces within the separating medium. The higher the water retention, the larger the volume of the pores possessed by the separating medium. In cases when the pore diameter is constant, the effective surface area increases as the water retention increases. Higher water retentions are hence preferred from the standpoints of increasing the adsorption capacity and improving the separating properties. The water retention is preferably 95% by weight or less from the standpoint of physical strength. In cases when a high-molecular-weight polymer or the like is introduced in a surface treatment, the introduced substance tends to occupy some of the spaces within the pores, resulting in a decrease in water retention.

The water retention of the separating medium of the invention is determined by the method which will be described later in the Examples.

<Average Particle Diameter>

The average particle diameter of the separating medium of the invention is preferably in the range of 1 to 1,000 µm, more preferably 10 to 100 µm, even more preferably 30 to 60 µm. In cases when the average particle diameter thereof is not less than the lower limit, this separating medium, after packed into a column, tends to less cause an increase in pressure loss during liquid passing, making it possible to heighten the liquid passing rate and heighten the treatment efficiency. Meanwhile, in cases when the average particle diameter thereof is not larger than the upper limit, a large adsorption amount and high separating performance tend to be maintained.

The average particle diameter of the separating medium of the invention is determined by the method which will be described later in the Examples.

The average particle diameter of the separating medium can be controlled by regulating the rate of stirring the emulsion, heating temperature during the stirring, kind and amount of the emulsifier to be used, shapes of the stirring blades and reaction tank, etc. in producing the porous epoxy resin particles in the manner described hereinabove. The average particle diameter of the separating medium is in substantially the same range as the average particle diameter of the porous epoxy resin particles used therefor.

<Strength at 10% Compressive Deformation>

It is desirable that separating medium should have sufficient strength which prevents the separating medium from deforming during liquid passing through the columns and enables the treatment to be performed at an appropriate liquid passing rate. It is preferable that the separating medium of the invention, when dried and examined with a micro-compression tester, should have a strength at 10% compressive deformation of 2.0 MPa or higher. The higher the strength at 10% compressive deformation, the more the separating medium is preferred. The strength at 10% compressive deformation thereof is more preferably 4.0 MPa or higher. However, from the standpoint of attaining both a suitable pore diameter and separation behavior, an upper limit of the strength is usually 20 MPa.

The strength at 10% compressive deformation of the separating medium of the invention is measured specifically by the method which will be described later in the Examples.

The separating medium of the invention is superior in that, as stated above, the separating medium has pores extending through each resin particle to the surface thereof, can have pore diameter and pore volume values not less than certain values, and can hence be used as a separating medium to treat various substances in large quantities. There is a general tendency that the mechanical strength of particles decreases as the pore diameter or pore volume increases. The separating medium of the invention, however, is high in mechanical strength represented by strength at 10% compressive deformation, even when the pore diameter or pore volume thereof is considerably large. This separating medium is hence highly excellent.

<Pressure Loss>

It is preferable that the separating medium of the invention should have a pressure loss, as determined through a measurement made by the following pressure loss measuring method, of 7.0 MPa or less, in particular, 3.0 MPa or less.

<Pressure Loss Measuring Method>

The separating medium is packed into a column having a capacity of 4 mL (inner diameter, 0.5 mm; layer height, 20 cm), and this column is connected to an HPLC system manufactured by Hitachi, Ltd. (Hitachi LC ELITE LaChrom; column oven L-2350; RI detector L-2490; autosampler L-2200). Pure water is passed through the column at a flow rate of 1.3 mL/min (linear velocity, 400 cm/h). The resultant indicated pressure was taken as the pressure loss.

In case where the pressure loss is too high, the separating medium is undesirably compressed by high-rate liquid passing to show an impaired separation behavior. In addition, it is necessary for high-rate liquid passing to use a pressure vessel as the chromatography column and to use a higher power for the liquid passing. Too high pressure losses are hence undesirable. The lower the pressure loss, the more the separating medium is preferred. However, from the standpoint of attaining both a low pressure loss and a suitable strength at 10% compressive deformation, a lower limit of the pressure loss is usually 0.5 MPa.

The pressure loss of the separating medium of the invention is measured specifically by the method which will be described later in the Examples.

The separating medium of the invention has a nonspecific adsorption property (%), as determined through the following nonspecific adsorption test, of preferably 5% or less, especially preferably 3% or less.

<Nonspecific Adsorption Test>

The separating medium dispersed in water is immersed in 2.5-mg/mL aqueous immunoglobulin G (IgG) solution and allowed to adsorb the IgG at 25° C. for 3 hours. The recovery of IgG is evaluated on the basis of the absorbances at 280 nm of the supernatant of before and after the adsorption. Furthermore, the separating medium after the IgG adsorption is taken out by centrifugal separation and rinsed in 0.1-N aqueous NaOH solution, and the resultant mixture is filtered. The filtrate is examined by a bicinchoninic acid protein assay (BCA) to determine the recovery of IgG due to the NaOH treatment. The sum of the IgG recovery (%) from the supernatant and the IgG recovery (%) due to the NaOH treatment, both based on the IgG contained in the aqueous IgG solution, is subtracted from 100%, and this value is taken as the value of nonspecific adsorption property (%).

In case where the separating medium has too large a value of nonspecific adsorption property, a desired substance may not be completely eluted during elution, resulting in a decrease in the recovery of the desired substance. In addition, this separating medium may adsorb impurities besides the desired substance, resulting in a decrease in the purity of the desired substance. Too large values of nonspecific adsorption property are hence undesirable. The lower the nonspecific adsorption properties, the better the separating medium. However, from the standpoint of the accuracy of evaluation conditions, a lower limit of the nonspecific adsorption properties is usually 0.1%.

The nonspecific adsorption properties of the separating medium of the invention are specifically determined by the method which will be described later in the Examples.

[Separating Medium According to Second Aspect]

The porous resin particles for constituting the separating medium according to the second aspect of the invention are porous resin particles which are not the porous epoxy resin particles for constituting the separating medium according to the first aspect. Examples thereof include: porous crosslinked particles obtained by (co)polymerizing one or more of monovinyl monomers including aromatic monovinyl compounds such as styrene monomers including styrene, ethylstyrene, methylstyrene, hydroxystyrene, and chlorostyrene, (meth)acrylic esters such as methyl (meth)acrylate, ethyl (meth)acrylate, hydroxyethyl (meth)acrylate, hydroxypropyl (meth)acrylate, butyl (meth)acrylate, 2-ethylhexyl (meth)acrylate, cyclohexyl (meth)acrylate, and glycerin mono(meth)acrylate, (meth)acrylamide compounds such as (meth)acrylamide, dimethyl(meth)acrylamide, and hydroxyethyl(meth)acrylamide, nitriles such as (meth)acrylonitrile, epoxy-group-containing compounds such as glycidyl (meth)acrylate, 4,5-epoxybutyl (meth)acrylate), and 9,10-epoxystearyl (meth)acrylate, and other vinyl esters and vinyl ethers and then introducing a crosslinked structure into the resultant (co)polymer using a crosslinking agent such as epichlorohydrin, a (poly)alkylene glycol diglycidyl ether, or an alkylene diisocyanate. Examples thereof further include porous crosslinked particles obtained by (co)polymerizing one or more of polyvinyl compounds including aromatic polyvinyl compounds such as divinylbenzene and trivinylbenzene, polyesters of (meth)acrylic acid, such as (poly)ethylene glycol di(meth)acrylate and glycerol di(meth)acrylate, polycarboxylic acid polyvinyl esters, polycarboxylic acid polyallyl esters, polyol polyvinyl ethers, polyol polyallyl ethers, butadiene, methylenebisacrylamide, and triallyl isocyanurate, or obtained by copolymerizing one or more of such polyvinyl compounds with one or more of the monovinyl monomers shown above.

Preferred from the standpoint of industrial production efficiency are porous crosslinked particles obtained by copolymerizing one or more polyvinyl compounds with one or more monovinyl monomers.

Examples of the "treatment" for the separating medium according to the second aspect include the same treatments usable for producing the separating medium according to the first aspect described above.

Preferred ranges of the average particle diameter and average pore diameter of the separating medium according to the second aspect are also the same as for the separating medium according to the first aspect.

The strength at 10% compressive deformation of the separating medium according to the second aspect is 2.0 MPa or higher, preferably 4.0 MPa or higher, and is usually 20 MPa or less, for the same reason as in the case of the separating medium according to the first aspect.

The nonspecific adsorption properties thereof are 5% or less, preferably 3% or less, and are usually 0.1% or higher, for the same reason as in the case of the separating medium according to the first aspect.

[Applications]

Separating medium for chromatography are classified, by separation mode, into: size-exclusion separating medium for excluding high-molecular-weight impurities and separating a desired substance by allowing the substance to diffuse into the pores; flow-through type separating medium for adsorptively removing low-molecular-weight impurities, such as nucleic acids, only; and ligand type separating medium for adsorptively separating a desired substance by a ligand. The separating medium of the invention can be used as any of these separating medium.

It is preferable that the separating medium of the invention should be used for separation for biomolecule purification. The separating medium are especially suitable for use as separating medium for protein purification, which are for separating proteins as target molecules, in particular, for separating antibodies, e.g., full-length antibodies and low-molecular-weight antibodies, protein A, and modifications thereof.

Especially preferred target molecules include immunoglobulins, fusion proteins containing at least some of the Fc region of an immunoglobulin, and proteins obtained by chemically modifying these. Preferred of these are immunoglobulins which are monoclonal antibodies or polyclonal antibodies.

A treatment for separating target molecules preferably includes the following steps.

(a) A step in which a solution containing target molecules is brought into contact with the separating medium to allow the separating medium to adsorb the target molecules.

(b) A step in which the target molecules are eluted from the separating medium having the target molecules adsorbed thereon.

Such a method enables various proteins, such as those shown above, to be separated with satisfactory selectivity.

The separating medium of the invention are suitable also for use as separating medium for vaccine purification. Many vaccine components are larger than proteins such as antibodies. Examples of methods for the purification hence include a method in which a vaccine is treated while avoiding vaccine component diffusion into the pores and a method in which large pores are utilized to diffuse vaccine components thereinto. In the case of the flow-through type, the ligand type, and the like, suitable conditions can be set by regulating the pH, etc. From the standpoint of attaining a higher purity, the method in which vaccine components are diffused into pores is more preferred.

Furthermore, the separating medium of the invention can be used as separating medium for amino acids, monosaccharides, oligosaccharides, organic acids, amines, biological fluids, etc.

For a separation treatment with a separating medium of the invention, it is preferred to use a column for liquid chromatography that contains the separating medium of the invention and includes at least one vessel in which the separating medium has been packed.

EXAMPLES

The invention will be explained below in more detail by reference to Examples, but the invention is not limited to the following Examples unless the invention departs from the spirit thereof.

[Evaluation Methods]

The separating medium obtained by treating the porous resin particles obtained in the following Production Examples, Examples, and Comparative Examples were evaluated by the following methods.

<Average Particle Diameter>

A particle size distribution was determined using laser diffraction/scattering type particle size distribution analyzer LA-920, manufactured by Horiba Ltd. Specifically, a small amount of sample resin particles dispersed in water were dispersed in flow cell water. This flow cell was irradiated with laser light to obtain a particle size distribution from the resultant diffracted- and scattered-light intensity pattern. The median diameter (50% diameter) value of the particle size distribution was taken as the average particle diameter.

<Average Pore Diameter>

The average pore diameter was determined by the mercury intrusion method.

The mercury intrusion method is a method in which mercury is intruded into open voids by applying a pressure, and the diameters of the pores, which are assumed to be cylindrical, are calculated from the pressure value and the corresponding volume of the intruded mercury using the Washburn equation. This measurement can be made in accordance with JIS R1655, which is for shaped ceramic objects.

Sample resin particles which had been dried were weighed and placed in a cell for AutoPore IV9520, manufactured by Micromeritics Corp., and then subjected to a pretreatment for degassing under vacuum (50 μmHg×10 min). The AutoPore was then used to determine a mercury intrusion exit curve. A histogram showing a pore distribution was obtained in which the pore volume was plotted as ordinate and the pore diameter as abscissa, and the pore diameter for the segment in the histogram where the total pore volume was the largest was taken as the average pore diameter.

<Nonspecific Adsorption Test>

Sample resin particles dispersed in water were immersed in 2.5-mg/mL aqueous immunoglobulin G (IgG) solution and allowed to adsorb the IgG at 25° C. for 3 hours. The recovery of IgG was evaluated on the basis of the absorbances at 280 nm of the supernatant of before and after the adsorption. Furthermore, the resin particles after the IgG adsorption were taken out by centrifugal separation and rinsed in 0.1-N aqueous NaOH solution, and the resultant mixture was filtered. The filtrate was examined by BCA to evaluate the recovery of IgG due to the NaOH treatment. The sum of the IgG recovery (%) from the supernatant and the IgG recovery (%) due to the NaOH treatment, both based on the IgG contained in the aqueous IgG solution, was subtracted from 100%, and this value was taken as the value of nonspecific adsorption property (%). The smaller the value thereof, the more the resin particles are preferred.

<Water Retention>

Sample resin particles dispersed in water were filtered by suction filtration with a membrane filter (hydrophilic Durapore SVLP04700 (5 μm), manufactured by Merck Millipore) for 5 minutes or more until the water dripping ended. The wet weight (Wg) of the resin particles obtained was measured. These wet resin particles were vacuum-dried at 50° C. for 9 hours using rectangular constant-temperature vacuum dryer DP200, manufactured by Yamato Scientific Co., Ltd., and the dry weight (Dg) of the vacuum-dried resin particles was measured. The amount of the water was determined by calculating W−D. The value of (amount of the water)/(wet weight of the resin particles)×100=(W−D)/W×100 was taken as the water retention.

<Strength at 10% Compressive Deformation>

Micro-compression tester "MCT-W500", manufactured by Shimadzu Corp., was used to measure the 10% displacement strength of each of ten or more particles arbitrarily selected from sample resin particles which had been dried by heating (50° C., 8 hours) under reduced pressure. An average thereof was taken as the strength at 10% compressive strength.

<Pressure Loss>

Sample resin particles were packed into a column having a capacity of 4 mL (inner diameter, 0.5 mm; layer height, 20 cm), and this column was connected to an HPLC system manufactured by Hitachi, Ltd. (Hitachi LC ELITE LaChrom; column oven L-2350; RI detector L-2490; autosampler L-2200). Pure water was passed through the column at a flow rate of 1.3 mL/min (linear velocity, 400 cm/h). The resultant indicated pressure was taken as the pressure loss.

<Evaluation of Separation Behavior (iSEC)>

Separating medium 1 to 3 were each packed into a column having a capacity of 4 mL (inner diameter, 0.5 mm; layer height, 20 cm), and this column was connected to an HPLC system manufactured by Hitachi, Ltd. (Hitachi LC ELITE LaChrom; column oven L-2350; RI detector L-2490; autosampler L-2200). An aqueous solution containing ethylene glycol (EG; molecular weight, 62) and dextrans having different molecular weights was injected into the column with the autosampler. The effluent was analyzed, and each separating medium was evaluated for relationship between molecular weight and retention volume from the results of the analysis. The chromatographic examination was made under the conditions of a flow rate of 0.125 mL/min, sample amount of 10 μm, and column temperature of 30° C. The molecular weights of the dextrans used for the examination were: $4\times10^4$, $6\times10^4$, $1.5\times10^4$, $1.5\times10^5$ ($100\times10^3$ to $200\times10^3$), $2.5\times10^5$ ($200\times10^3$ to $300\times10^3$), $5\times10^5$, $2.2\times10^6$ ($1.5\times10^6$ to $2.8\times10^6$), $5>10^6$ ($3\times10^6$ to $7\times10^6$), and $2.3\times10^7$ ($5\times10^6$ to $40\times10^6$).

Production Example 1

(Preparation of Starting-Material Mixture)

Use was made of 1.6 parts by weight of polyfunctional compound containing an epoxy group "triglycidyl isocyanurate" (trade name "TEPIC-S", manufactured by Nissan Chemical Industries, Ltd.), which was represented by the following formula (a) and had an epoxy equivalent of 99, 0.37 parts by weight of polyfunctional compound containing an amino group "bis(4-aminocyclohexyl)methane" (manufactured by Tokyo Kasei Kogyo Co., Ltd.), which was represented by the following formula (b) and had an amine value of 520-550, as a hardener, and 7 parts by weight of "polyethylene glycol (PEG)" (trade name "Polyethylene Glycol 200", manufactured by Wako Pure Chemical Industries Ltd.), which had an average molecular weight of 200, as a porogen. The TEPIC-S and the PEG200 were melted by heating to 110° C. beforehand, and the bis(4-aminocyclohexyl)methane separately melted by heating at 85° C. was added thereto. This mixture was mixed using a vortex mixer at 3,000 rpm for several minutes to obtain a starting-material mixture.

[Chem. 7]

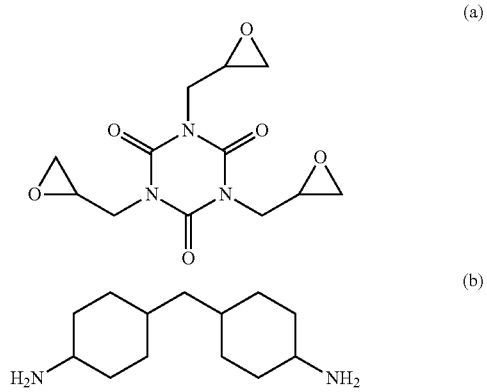

(Preparation of Dispersion)

A solution obtained by dissolving 0.6 g of block copolymer (dispersant) K-1 in 10 g of dodecane was prepared as a dispersion medium in a cylindrical sample bottle made of glass (inner diameter, 19 mm; height, 60 mm). Thereto was added 8.97 g of the starting-material mixture obtained above. The resultant mixture was stirred (for 6-10 minutes) until the apparent emulsified state became stable, thereby preparing a dispersion. Prior to the preparation of the dispersion, the dispersion medium had been heated to 50° C. or higher. The block copolymer K-1 was a block copolymer synthesized by the living radical polymerization of 5 parts by weight of lauryl methacrylate (hereinafter abbreviated to LMA) with 9.34 parts by weight of polyethylene glycol methacrylate (hereinafter abbreviated to PEGMA) and having a number-average molecular weight of 18,700 and a PDI of 1.27.

(Polymerization Step and Post-Treatment)

The dispersion was heated in a high-temperature bath at a temperature of 90° C. while stirring the dispersion with a stirrer at a rotation speed of 50 rpm, thereby polymerizing the starting materials for 180 minutes. The mixture obtained by the polymerization was added to tetrahydrofuran, and this mixture was sufficiently stirred. Thereafter, the porous epoxy resin particles yielded were separated using a centrifugal separator. This step of washing with tetrahydrofuran was repeatedly conducted ten times to sufficiently remove the porogen, remaining starting-material compounds, etc. The washed particles were vacuum-dried to obtain 1.75 g of spherical porous particles made of an epoxy resin. These porous particles are referred to as porous epoxy resin particles 1. The porous epoxy resin particles 1 obtained were spherical particles which each had a three-dimensional network backbone structure having a columnar backbone and which had an average particle diameter of 29 μm.

Production Example 2

Porous particles were produced under the same conditions as in Production Example 1, except that the polymerization temperature in (Polymerization Step and Post-treatment) of Production Example 1 was changed to 80° C. Thus, 1.83 g of spherical porous particles were obtained. These porous particles are referred to as porous epoxy resin particles 2. The porous epoxy resin particles 2 obtained were spherical particles which each had a three-dimensional network backbone structure having a columnar backbone and which had an average particle diameter of 26 μm.

Production Example 3

Porous particles were produced under the same conditions as in Production Example 1, except that PEG200, the dispersant, and the dispersion medium were used in amounts of 8.4 parts by weight, 0.67 parts by weight, and 9 parts by weight, respectively, in (Preparation of Starting-material Mixture) of Production Example 1, and polymerization was conducted. Thus, 1.85 g of spherical porous particles were obtained. These porous particles are referred to as porous epoxy resin particles 3. The porous epoxy resin particles 3 obtained were spherical particles which each had a three-dimensional network backbone structure having a columnar backbone and which had an average particle diameter of 38 μm.

Example 1

In a flask equipped with a stirrer, 5% by weight aqueous sulfuric acid solution was added to porous epoxy resin particles 1, which had been obtained in Production Example 1. The contents were stirred with heating at 50° C. for 5 hours, thereby hydrophilizing the particles 1. The treated porous epoxy resin particles were taken out with a filter and washed with water to remove the sulfuric acid. Thus, separating medium 1 was obtained.

Example 2

Porous epoxy resin particles 2, which had been obtained in Production Example 2, were hydrophilized with sulfuric acid in the same manner as in Example 1. Thus, separating medium 2 was obtained.

Example 3

Porous epoxy resin particles 3, which had been obtained in Production Example 3, were hydrophilized with sulfuric acid in the same manner as in Example 1. Thus, separating medium 3 was obtained.

Comparative Example 1

To an aqueous solution obtained by dissolving 0.5 parts by weight of poly(vinyl alcohol) in 100 parts by weight of water was added a mixture of 80 parts by weight of glycidyl methacrylate, 20 parts by weight of ethylene glycol dimethacrylate, 1 part by weight of 2,2'-azobis(2,4-dimethylvaleronitrile), and 100 parts by weight of dichloropropane. This mixture was stirred and brought into a suspension state. In this mixing, the rate of stirring was regulated so as to result in an average droplet diameter of about 45 μm. This suspension was heated to 70° C. and reacted for 6 hours. The resultant mixture was cooled and then filtered, and the solid matter was washed with water to obtain porous methacrylic resin particles. The porous methacrylic resin particles thus obtained were each an aggregate composed of fine resin particles.

Comparative Example 2

Into a 100-mL polypropylene beaker were introduced 10 g of commercial bisphenol A diglycidyl ether epoxy resin jER 828 (manufactured by Mitsubishi Chemical Corp.) and 2 g of triacetylene (manufactured by Tokyo Kasei Kogyo Co., Ltd.). The ingredients were mixed together to obtain a homogeneous liquid. A stirring rod having a semicircular Teflon (registered trademark) blade (36 mm) attached to the end was inserted into the liquid to stir the liquid at 100 rpm. Ten grams of an aqueous solution containing 1.5 g of poly(vinyl alcohol) GL-05 (manufactured by The Nippon Synthetic Chemical Industry Co., Ltd.), which had been separately prepared, was added to the jER828/triacetylene mixture at an interval of 3 minutes in an amount of 2.5 g each time.

As a result, the jER828/triacetylene mixture was emulsified within the polypropylene beaker to give a white emulsion.

Subsequently, 8 g of water containing 1.9 g of piperazine (manufactured by Tokyo Kasei Kogyo Co., Ltd.) was added as a hardener to the emulsion, and the resultant mixture was allowed to stand still at room temperature to cure the resin for 5 days. As a result, fine spherical particles having an average particle diameter of about 14 μm were obtained. These particles were taken out by filtration, washed, and then re-dispersed in 100 mL of water. Five grams of 4-N $H_2SO_4$ was added to the dispersion, which was then treated at 90° C. for 2 hours. The particles were taken out by filtration and washed again, and were then air-dried.

These particles were introduced into a Soxhlet fat extractor, and extraction was conducted for 5 hours at the boiling point of ethanol, thereby obtaining epoxy resin particles. The epoxy resin particles which had undergone the extraction showed a water retention of about 16% by weight. In the examination for determining average pore diameter, no pores of 10 nm or larger were detected.

In Table 1 are shown the results of the evaluation of the average particle diameter and other properties of the porous resin particles or resin particles obtained in each of Production Examples 1 to 3, Examples 1 to 3, and Comparative Examples 1 and 2.

In Table 2 are shown the results of the evaluation of separation behavior (iSEC) of separating medium 1 to 3, which were obtained in Examples 1 to 3, and the resin particles obtained in Comparative Example 2.

TABLE 1

| | Kind of particles | Average particle diameter (μm) | Average pore diameter (nm) | Nonspecific adsorption property (%) | Strength at 10% compressive deformation (MPa) | Pressure loss (MPa) | Water retention (wt %) |
|---|---|---|---|---|---|---|---|
| Example 1 | hydrophilized porous epoxy resin particles | 28 | 50 | 2 | 10.6 | 1.8 | 70 |
| Example 2 | | 29 | 270 | 2 | 8.6 | 1.8 | 70 |
| Example 3 | | 41 | 1100 | 2 | 2.6 | 2.0 | 81 |
| Production Example 1 | porous epoxy resin particles | 29 | — | 18 | — | — | — |
| Production Example 2 | | 26 | — | 13 | — | — | — |
| Production Example 3 | | 38 | — | 7 | — | — | — |
| Comparative Example 1 | porous methacrylic resin particles | 45 | 50 | 0 | 1.6 | 8.0 | — |
| Comparative Example 2 | epoxy resin particles | 14 | no pores detected | — | — | — | 16 |

* "—" indicates omission of the evaluation.

TABLE 2

| | | Retention volume in iSEC (mL) | | | | | | | |
|---|---|---|---|---|---|---|---|---|---|
| | | Dextrans | | | | | | | |
| | | $2.3 \times 10^7$ | $5 \times 10^6$ | $2.2 \times 10^6$ | $5 \times 10^5$ | $2.5 \times 10^5$ | $1.5 \times 10^5$ | $6 \times 10^4$ | EG |
| Example 1 | Separating medium 1 | 2.02 | 2.00 | 1.89 | 2.08 | 2.38 | 2.41 | 2.45 | 3.12 |
| Example 2 | Separating medium 2 | 2.53 | 2.14 | 2.43 | 2.70 | 2.98 | 3.02 | 3.09 | 3.57 |
| Example 3 | Separating medium 3 | 3.36 | 3.07 | 3.39 | 3.46 | 3.51 | 3.54 | 3.56 | 3.71 |
| Comparative Example 2 | Resin particles | 1.91 | 1.95 | 2.28 | 2.23 | 2.14 | 2.15 | 2.19 | 2.59 |

The following can be seen from Table 1.

The separating medium 1 to 3 of the invention, which had been obtained by treating porous epoxy resin particles, each showed lower nonspecific adsorption properties than the untreated porous epoxy resin particles. The hydrophilizing treatment with sulfuric acid inhibited the surface of the porous epoxy resin particles from adsorbing the protein, resulting in an improvement in recovery. Separating medium 1 to 3 of the invention each had a sufficiently high strength at 10% compressive deformation and an exceedingly low pressure loss as compared with the porous methacrylic resin particles of Comparative Example 1. In addition, separating medium 1 to 3 of the invention were each able to be ascertained, through an SEM examination, to have pores extending through each particle to the surface thereof, and the average pore diameter as determined by the mercury intrusion method can be regulated in a desired range. These separating medium had sufficiently high water retentions as compared with that of Comparative Example 2.

It can be seen that the resin particles of Comparative Example 2 had no detectable pores of 10 nm or larger and had a water retention as extremely small as less than 20% by weight. Furthermore, the SEM examination revealed that the surface had no effective open voids, and it can be seen that the amount of internal pores, if any, was small.

This is presumed to be because the epoxy resin particles used for separating medium 1 to 3 of the invention had pores which had been formed by phase separation during the polymerization, whereas the resin particles of Comparative Example 2 were resin particles formed by polymerization without involving phase separation because of a difference in synthesis method.

It can be seen from Table 2 that separating medium 1 to 3 of the invention had a correlation between molecular weight and retention volume and can be used as size-exclusion separating medium. It can be seen that the retention volume increased in the order of separating medium 1, separating medium 2, and separating medium 3, showing that the larger the average pore diameter of the separating medium, the larger the retention volume. The resin particles of Comparative Example 2 showed substantially the same retention volume over the molecular-weight range of the dextrans, indicating that the resin particles had no separating properties.

While the invention has been described in detail and with reference to specific embodiments thereof, it will be apparent to one skilled in the art that various changes and modifications can be made therein without departing from the spirit and scope thereof. This application is based on a Japanese patent application filed on Aug. 10, 2015 (Application No. 2015-158420), and the contents thereof being incorporated herein by reference.

The invention claimed is:

1. A separating medium obtained by treating porous epoxy resin particles, which has an average pore diameter of 10 to 2,000 nm,
    wherein the epoxy resin particles are particles of an epoxy resin obtained by a ring-opening reaction of the epoxy groups.

2. A separating medium obtained by treating porous epoxy resin particles, which has a water content of 50% by weight or higher,
    wherein the epoxy resin particles are particles of an epoxy resin obtained by a ring-opening reaction of the epoxy groups.

3. The separating medium according to claim 2, which has an average pore diameter of 10 to 2,000 nm.

4. The separating medium according to claim 1, wherein the corresponds to an addition polymer comprising a polyfunctional compound containing an epoxy group and a polyfunctional compound containing an amino group, which has an average particle diameter of 1 to 1,000 μm.

5. The separating medium according to claim 4, wherein the polyfunctional compound containing an epoxy group is at least one of N,N,N',N'-tetraglycidyl-m-xylylenediamine and triglycidyl isocyanurate.

6. The separating medium according to claim 1, wherein the treatment is a hydrophilization treatment wherein a compound having at least one of a hydroxyl group and an amino group is added to epoxy groups remaining in the surface of the porous epoxy resin particles, thereby opening the rings of the epoxy groups.

7. The separating medium according to claim 1, wherein the treatment is a grafting treatment in which a water-soluble polymer having an ionic functional group is added to the porous epoxy resin particles through at least one of epoxy groups and amino groups remaining in the surface of the porous epoxy resin particles.

8. The separating medium according to claim 1, wherein the treatment is a coupling treatment in which at least one of a protein and a protein derivative is added to the porous epoxy resin particles through at least one of epoxy groups and amino groups remaining in the surface of the porous epoxy resin particles.

9. The separating medium according to claim 1, which satisfies the following properties (1) and (2):
    (1) the separating medium, when dried and examined with a micro-compression tester, has a strength at 10% compressive deformation of 2.0 MPa or higher; and
    (2) a pressure loss of 7.0 MPa or less, wherein the pressure loss is determined by:

packing the separating medium into a column having a capacity of 4 mL, an inner diameter of 0.5 mm, and a layer height of 20 cm; connecting this column to an HPLC system manufactured by Hitachi, Ltd. (Hitachi LC ELITE LaChrom; column oven L-2350; RI detector L-2490; autosampler L-2200);

passing pure water through the column at a flow rate of 1.3 mL/min (linear velocity, 400 cm/h); and measuring the pressure loss as a resultant indicated pressure.

10. The separating medium according to claim 1, which has a nonspecific adsorption property of 5% or less, wherein the nonspecific adsorption property is determined by:

immersing the separating medium disperse in water in 2.5-mg/mL aqueous immunoglobulin G (IgG) solution;

allowing the separating medium to adsorb the IgG at 25° C. for 3 hours;

performing centrifugal separation to take out the IgG adsorption, rinsing in 0.1N aqueous NaOH solution and filtering the resultant mixture, to obtain a filtrate; and examining the filtrate by a bicinchoninic acid protein assay (BCA) to determine the recovery of IgG due to the NaOH treatment, where the recovery of the IgG is evaluated on the basis of the absorbances at 280 nm of the supernatant of before and after the adsorption, wherein a sum of the IgG recovery (%) from the supernatant and the IgG recovery (%) due to the NaOH treatment, both based on the IgG contained in the aqueous IgG solution, is subtracted from 100%, and this value is taken as the value of nonspecific adsorption property (%).

11. A separating medium for vaccine purification, which includes the separating medium according to claim 1.

12. A separating medium for protein purification, which includes the separating medium according to claim 1.

13. A column for liquid chromatography which includes the separating medium according to claim 1 and a vessel in which the separating medium has been packed.

14. The separating medium according to claim 1, which has an average pore diameter of 200 to 2,000 nm.

15. The separating medium according to claim 2, which has an average pore diameter of 200 to 2,000 nm.

16. The separating medium according to claim 1, which has an average particle diameter of 30 to 1,000 μm.

17. The separating medium according to claim 2, which has an average particle diameter of 30 to 1,000 μm.

* * * * *